(12) United States Patent
Takizawa et al.

(10) Patent No.: US 8,400,100 B2
(45) Date of Patent: Mar. 19, 2013

(54) ELECTRIC POWER CONVERTER

(75) Inventors: Satoki Takizawa, Hino (JP); Masakazu Gekinozu, Matsumoto (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 403 days.

(21) Appl. No.: 12/838,416

(22) Filed: Jul. 16, 2010

(65) Prior Publication Data

US 2011/0012543 A1   Jan. 20, 2011

(30) Foreign Application Priority Data

Jul. 17, 2009   (JP) .................................. 2009-168835

(51) Int. Cl.
   H02P 27/04   (2006.01)
(52) U.S. Cl. ........................... 318/803; 318/806; 363/34
(58) Field of Classification Search .................. 318/800, 318/803, 806, 139; 363/34, 37, 39, 41, 123
   See application file for complete search history.

(56) References Cited

U.S. PATENT DOCUMENTS

| | | | |
|---|---|---|---|
| 5,517,401 A | 5/1996 | Kinoshita et al. | |
| 5,929,537 A * | 7/1999 | Glennon | 307/46 |
| 6,404,655 B1 * | 6/2002 | Welches | 363/41 |
| 6,683,389 B2 * | 1/2004 | Geis | 290/40 C |
| 6,819,012 B1 * | 11/2004 | Gabrys | 307/68 |

FOREIGN PATENT DOCUMENTS

| | | |
|---|---|---|
| JP | 05-308778 A | 11/1993 |
| JP | 2005-057938 A | 3/2005 |

\* cited by examiner

*Primary Examiner* — Rina Duda

(74) *Attorney, Agent, or Firm* — Rabin & Berdo, P.C.

(57) ABSTRACT

An electric power converter includes a DC to DC converter section adjusting DC power of a battery with at least two units in series, a DC circuit having at least two DC link capacitors in series between a positive and a negative line from the DC to DC converter section, an electric power converter section connected to the DC circuit to convert DC electric power to AC electric power for a motor, a bilateral switching circuit connecting an intermediate potential point between the capacitors and an AC output point in the electric power converter section, and a short-circuit between the intermediate potential point of the DC circuit and an intermediate potential point between the battery units. Normal operation of a load is ensured even when the battery, the capacitor in the DC circuit or the switching device in the electric power converter section becomes abnormal, while achieving high efficiency.

17 Claims, 32 Drawing Sheets

ELECTRIC POWER CONVERTER

FIELD OF THE INVENTION

The present invention relates to an electric power converter which can be applied to a device such as a hybrid electric vehicle or an electric vehicle that drives a motor by electric power supplied from at least a battery.

BACKGROUND ART

For an electric power converter of a equipment represented by a hybrid electric vehicle, a converter, for example, is known which has a configuration given in FIG. 25, a block diagram sowing a circuit configuration of a related power converter. More specifically, the electric converter has a configuration including a DC power supply unit 102, a DC to DC converting circuit 104, a DC circuit 105 and a DC to AC converting circuit 106. The DC power supply unit 102 is formed with an AC to DC converting circuit converting three-phase AC electric power generated by an AC generator 101 to DC electric power. The DC to DC converting circuit 104 raises the DC voltage of a battery 103 connected between a positive electrode side line Lp and a negative electrode side line Ln of the DC power supply unit 102. The DC circuit 105 has a DC link capacitor connected in parallel to the DC to DC converting circuit 104. The DC to AC converting circuit 106 converts DC power outputted from the DC circuit 105 to AC power. The three-phase AC power outputted from the output points of the DC to AC converting circuit 106 is supplied to an AC motor 107.

In such a hybrid electric vehicle, though not illustrated, wheels of the vehicle are driven to rotate by the AC motor 107 while being connected to the AC motor 107 directly or through a reduction gear. Moreover, when an electric vehicle is in braking or in running a downhill, the AC motor 107 is operated as a generator to bring a power flow into a state of regeneration in which the power flows in the direction from the side of the AC motor 107 to the side of the battery 103 or the AC generator 101. This makes the battery 103 carry out output of complementary power (battery discharging) for driving the AC motor 107 and recovery of regenerated energy (battery charging) under a regenerating condition in which power is supplied from the AC motor 107. A this time, with a reactor forming the DC to DC converting circuit 104 and semiconductor switching devices and diodes connected in inverse parallel to them, the battery voltage is raised to the voltage of the DC circuit 105 at discharging of the battery and reduce the voltage of the DC circuit 105 to the battery voltage at charging of the battery.

With a similar operation, an exchange of power becomes possible also between the battery 103 and the AC generator 101. This, with the circuit configuration provided as given in FIG. 25, enables mutual exchanges of power among the AC generator 101, the AC motor 107 and the battery 103.

Of the electric power converters with their configurations similar to that shown in FIG. 25, an electric power converter is also known which has a configuration having an electric power converting unit of three-level circuit (see JP-A-5-308778, for example). In the electric power converter, a DC circuit is formed with a pair of capacitors connected in series between the positive electrode side line Lp and the negative electrode side line Ln, and the electric power converting unit is provided to have a configuration in which three sets of inverter arms, each formed with four switching devices connected in series, are connected in parallel. From the connection point of a second and third switching devices in each of the inverter arms, a connection line to an AC output terminal is derived. The connection point of a first and second switching devices is connected to an intermediate potential point as a connection point of the capacitors in the DC circuit through a diode. The connection point of the third and fourth switching devices is also connected to the intermediate potential point in the DC circuit through a diode.

Moreover, an electric power converter is also proposed in which a voltage of a battery for electricity accumulation or a capacitor is used for a voltage of one phase of three phases of an output with its value taken as approximately one-half of that of the voltage of a DC power supply and, along with this, an inverter controlling unit is provided which carries out control so that the voltages of the rest two phases of the three phases of the output are outputted with the electric potential of the battery for electricity accumulation or the capacitor taken as a reference (see JP-A-2005-57938, for example). In the electric power converter, the voltage of the battery for electricity accumulation or the capacitor is utilized as it is as a voltage of a terminal of a motor to omit semiconductor switching devices for one phase so that a three-phase motor is driven with four semiconductor switching devices.

However, in the example of the related electric power converter shown in FIG. 25, the DC to AC converting circuit 106, having a two level converter circuit configuration, causes voltage variation to become larger with each on-off control of the switching device. This increases a switching loss of the switching device (an IGBT and a diode) and, along with this, also on the side of the AC motor 107, increases a ripple in a flowing current to increase a harmonic loss due to carrier frequency components, which results in a decrease in efficiency of the AC motor to be an unsolved problem. For solving the unsolved problem, there is an idea of providing the configuration of the DC to AC converting circuit 106 with a three-level circuit as in the example of the related converter described in JP-A-5-308778. However, the DC to AC converting circuit 106 with a configuration normally provided with the three-level circuit causes controls of the twelve switching devices forming the DC to AC converting circuit 106 to be complicated to increase the load on the control circuit controlling the DC to AC converting circuit 106, which becomes a new problem.

Moreover, in the example of the related electric power converter shown in FIG. 25 and the examples of the related electric power converter described in JP-A-5-308778 and JP-A-2005-57938, an electric vehicle normally has a battery mounted in which tens of units of batteries each having an output voltage of several volts are connected in series to be provided as a battery with an output voltage of hundreds of volts. Thus, when only any one unit causes failure for some reason, the battery units connected in series causes the whole of the battery system to become unusable. Therefore, in a battery system with battery units simply connected in series as shown in FIG. 25, there is also an unsolved problem in that the reliability of the system can not be improved.

Furthermore, in the example of the related electric power converter shown in FIG. 25 and the examples of the related electric power converter described in JP-A-5-308778 and JP-A-2005-57938, when the capacitor CO in the DC circuit 105 causes failure, smoothing of the DC voltage becomes impossible and a storage component of energy is lost. Thus, there is also an unsolved problem in that this disables the converter from being normally operated as an electric power converter.

Still further, in the example of the related electric power converter shown in FIG. 25 and the examples of the related electric power converters described in JP-A-5-308778 and JP-A-2005-57938, when an IGBT or a diode in any phase forming the DC to AC converting circuit 106 becomes abnormal, a three-phase balanced operation of the AC motor 107 becomes impossible. Thus, there is also an unsolved problem in that this makes the AC motor 107 incapable of being normally operated.

Accordingly, the invention was made by giving attention to the unsolved problems in the above examples of the related electric power converters with an object of providing an electric power converter which can ensure a normal operation of an AC motor as required even in the case when a battery, a capacitor in a DC circuit or switching devices in an electric power converting unit become abnormal while making the electric power converter and the AC motor highly efficient.

SUMMARY OF THE INVENTION

For achieving the object, an electric power converter according to a first aspect of the invention includes: a DC to DC converter section adjusting DC electric power of a battery with at least two battery units connected in series; a DC circuit having at least two DC link capacitors connected in series between a positive electrode side line and a negative electrode side line derived from the DC to DC converter section; an electric power converter section connected to the DC circuit to convert DC electric power to AC electric power and supply the converted AC electric power to a motor; a bilateral switching device connecting an intermediate potential point between the at least two DC link capacitors in the DC circuit and an AC output point in the electric power converter section; and a short circuit formed with an intermediate potential line short-circuiting the intermediate potential point of the DC circuit and an intermediate potential point between the at least two battery units in the battery.

An electric power converter according to a second aspect of the invention includes: a DC power supply section outputting DC electric power by electric power generation; a DC to DC converter section adjusting DC electric power of a battery with at least two battery units are connected in series; a DC circuit having at least two DC link capacitors connected in series between a positive electrode side line and a negative electrode side line to which the DC power supply and the DC to DC converter section are connected; an electric power converter section connected to the DC circuit to convert DC electric power to AC electric power and supply the converted AC electric power to a motor; a bilateral switching device connecting an intermediate potential point between the at least two DC link capacitors in the DC circuit and an AC output point in the electric power converter section; and a short circuit formed with an intermediate potential line short-circuiting the intermediate potential point of the DC circuit and an intermediate potential point between the at least two battery units in the battery.

A third aspect of the invention is that, in the electric power converter according to the second aspect of the invention, the DC power supply section comprises an AC generator driven by an internal combustion engine and an AC to DC electric power converter section converting AC electric power generated by the AC generator to DC electric power;

A fourth aspect of the invention is that, in the electric power converter according to the second aspect of the invention, the DC power supply section is formed with a DC generator unit formed with at least one of a fuel cell and a solar cell.

A fifth aspect of the invention is that, in the electric power converter according to any one of the first to fourth aspects of the invention, the short circuit has a bilateral switching device inserted between the intermediate potential point in the DC circuit and the intermediate potential point in the battery.

A sixth aspect of the invention is that, in the electric power converter according to any one of the first to fifth aspects of the invention, the electric power converter section is provided with a plurality of switching arms corresponding to respective phases of polyphase AC electric power and connected in parallel between the positive electrode side line and the negative electrode side line, each switching arm has a pair of switching devices connected in series between the positive electrode side line and the negative electrode side line with the connection point served as the AC output point, and the switching devices are operated to convert DC electric power to polyphase AC electric power to be supplied to the motor, by which the motor is driven in two step speed regions of a low speed regions and a high speed regions, and an operation control mode of the switching devices and the bilateral switching devices is made differed between the case of driving the motor in the low speed region and the case of driving the motor in the high speed region.

A seventh aspect of the invention is that, in the electric power converter according to any one of the first to fifth aspects of the invention, the electric power converter section is provided with a plurality of switching arms corresponding to respective phases of polyphase AC electric power and connected in parallel between the positive electrode side line and the negative electrode side line, each switching arm has a pair of switching devices connected in series between the positive electrode side line and the negative electrode side line with the connection point served as the AC output point, and the switching devices are operated to convert DC electric power to polyphase AC electric power to be supplied to the motor, by which the motor is driven in three step speed regions of a low speed region, an intermediate speed region and a high speed region, and an operation control mode of the switching devices and the bilateral switching devices is made differed among the case of driving the motor in the low speed region, the case of driving the motor in the intermediate speed region and the case of driving the motor in the high speed region.

An eighth aspect of the invention is that, in the electric power converter according to the sixth aspect of the invention, when driving the motor in the low speed region, the motor is driven in a four switching device operation control mode in which, in the electric power converter section, switching devices in a switching arm corresponding to an arbitrary phase of the polyphase are brought into a normally turned-off states, only the bilateral switching device, connecting the intermediate potential point in the DC circuit and an AC output point in the switching arm having the switching devices being brought into the normally turned-off states, is brought into a normally turned-on state and on-off control is carried out with respect to the switching devices in switching arms other than the switching arm having the switching devices brought into the normally turned-off state and, when driving the motor in the high speed region, the motor is driven in a two-level operation control mode in which all of the bilateral switching devices connecting the intermediate potential point in the DC circuit and the AC output points in all of the switching arms are brought into normally turned-off states and on-off control is carried out with respect to all of the switching devices in all of the switching arms in the electric power converter section.

A ninth aspect of the invention is that, in the electric power converter according to the sixth aspect of the invention, when driving the motor in the low speed region, the motor is driven in a three-level operation control mode in which, in the electric power converter section, on-off control is carried out with respect to the switching devices in the switching arms and the bilateral switching devices connecting the intermediate potential point in the DC circuit and the AC output points in the switching arms and, when driving the motor in the high speed region, the motor is driven in the two-level operation control mode in which all of the bilateral switching devices connecting the intermediate potential point in the DC circuit and the AC output points in all of the switching arms are brought into normally turned-off states and on-off control is carried out with respect to all of the switching devices in all of the switching arms in the electric power converter section.

A tenth aspect of the invention is that, in the electric power converter according to the sixth aspect of the invention, when driving the motor in the low speed region, the motor is driven in the four switching device operation control mode in which, in the electric power converter section, switching devices in a switching arm corresponding to an arbitrary phase of the polyphase are brought into normally turned-off states, only the bilateral switching device, connecting the intermediate potential point in the DC circuit and an AC output point in the switching arm having the switching devices being brought into the normally turned-off states, is brought into a normally turned-on state and on-off control is carried out with respect to the switching devices in switching arms other than the switching arm having the switching devices brought into the normally turned-off state and, when driving the motor in the high speed region, the motor is driven in the three-level operation control mode in which, in the electric power converter section, on-off control is carried out with respect to the switching devices in the switching arms and the bilateral switching devices connecting the intermediate potential point in the DC circuit and the AC output points in the switching arms.

An eleventh aspect of the invention is that, in the electric power converter according to the seventh aspect of the invention, when driving the motor in the low speed region, the motor is driven in the four switching device operation control mode in which, in the electric power converter section, switching devices in a switching arm corresponding to an arbitrary phase of the polyphase are brought into normally turned-off states, only the bilateral switching device, connecting the intermediate potential point in the DC circuit and an AC output point in the switching arm having the switching devices being brought into the normally turned-off states, is brought into a normally turned-on state and on-off control is carried out with respect to the switching devices in switching arms other than the switching arm having the switching devices brought into the normally turned-off state, when driving the motor in the intermediate speed region, the motor is driven in the three-level operation control mode in which, in the electric power converter section, on-off control is carried out with respect to the switching devices in the switching arms and the bilateral switching devices connecting the intermediate potential point in the DC circuit and the AC output points in the switching arms, and when driving the motor in the high speed region, the motor is driven in the two-level operation control mode in which all of the bilateral switching devices connecting the intermediate potential point in the DC circuit and the AC output points in all of the switching arms are brought into normally turned-off states and on-off control is carried out with respect to all of the switching devices in all of the switching arms in the electric power converter section.

A twelfth aspect of the invention is that, in the electric power converter according to the fifth aspect of the invention, when an abnormality is detected in at least one of the battery units in the battery, the bilateral switching device inserted between the intermediate potential point in the DC circuit and the intermediate potential point of the battery is made opened and DC electric power of a normal battery unit is adjusted in the DC to DC converter section to be supplied to the DC circuit.

A thirteenth aspect of the invention is that, in the electric power converter according to any one of the first to twelfth aspects of the invention, when an abnormality is detected in at least one of the switching arms forming the electric power converter, the bilateral switching device, connected between the intermediate potential point in the DC circuit and the AC output point in the switching arm with the abnormality detected therein, is brought into a normally turned-on state and on-off control is carried out with respect to switching devices in switching arms other than the switching arm with the abnormality detected therein to make the motor driven.

A fourteenth aspect of the invention is that, in the electric power converter according to any one of the first to thirteenth aspects of the invention, when an abnormality is detected in one of the capacitors in the DC circuit, a bilateral switching device, forming a step-up circuit on the side with a polarity opposite to the polarity on the side of the capacitor with the abnormality detected therein, is brought into a normally turned-on state, the bilateral switching device connected to a battery unit on the same polarity side is brought into an opened state, and further, the motor is driven in a two-level operation control mode in which all of the bilateral switching devices connecting the intermediate potential point in the DC circuit and the AC output points in all of the switching arms are brought into normally turned-off states and on-off control is carried out with respect to all of the switching devices in all of the switching arms in the electric power converter section.

A fifteenth aspect of the invention is that, in the electric power converter according to any one of the first to fourteenth aspects of the invention, the DC to DC converter section comprises a positive electrode side switching arm having a pair of switching devices connected in series between the positive electrode side line and the intermediate potential line, a negative electrode side switching arm having a pair of switching devices connected in series between the intermediate potential line and the negative electrode side line, a first step-up reactor inserted between the connection point between the switching devices in the positive electrode side switching arm and the positive electrode side of the battery, and a second step-up reactor inserted between the connection point between the switching devices in the negative electrode side switching arm and the negative electrode side of the battery.

A sixteenth aspect of the invention is that, in the electric power converter according to any one of the first to fourteenth aspects of the invention, the DC to DC converter section comprises a positive electrode side switching arm having a pair of switching devices connected in series between the positive electrode side line and the intermediate potential line, a negative electrode side switching arm having a pair of switching devices connected in series between the intermediate potential line and the negative electrode side line, and a step-up reactor inserted in the short circuit, the connection point between the switching devices in the positive electrode side switching arm being connected to the positive electrode side of the battery, and the connection point between the switching devices in the negative electrode side switching arm being connected to the negative electrode side of the battery.

According to the invention, there can be obtained advantages that high efficiency operations of an electric power converting unit and a load become possible and, along with this, a normal operation of a load can be ensured even in the case when abnormalities occur in constituents such as a battery unit in a battery, a DC link capacitor in a DC circuit and a switching arm in an electric power converting unit.

Moreover, by applying the electric power converter having the above advantages to a motor driving system of a hybrid electric vehicle or an electric vehicle, a hybrid electric vehicle or an electric vehicle of a small size and of a low cost with a high reliability can be provided.

BRIEF DESCRIPTION OF THE DRAWINGS

FIG. 11 11A, 11B and 110 are block diagrams illustrating operations in the two-level operation control mode subsequent to those shown in FIG. 10A, 10B and 10C in the first embodiment;

DESCRIPTION OF THE PREFERRED EMBODIMENT

In the following, embodiments of the invention will be explained on the basis of the attached drawings.

Figure 1:
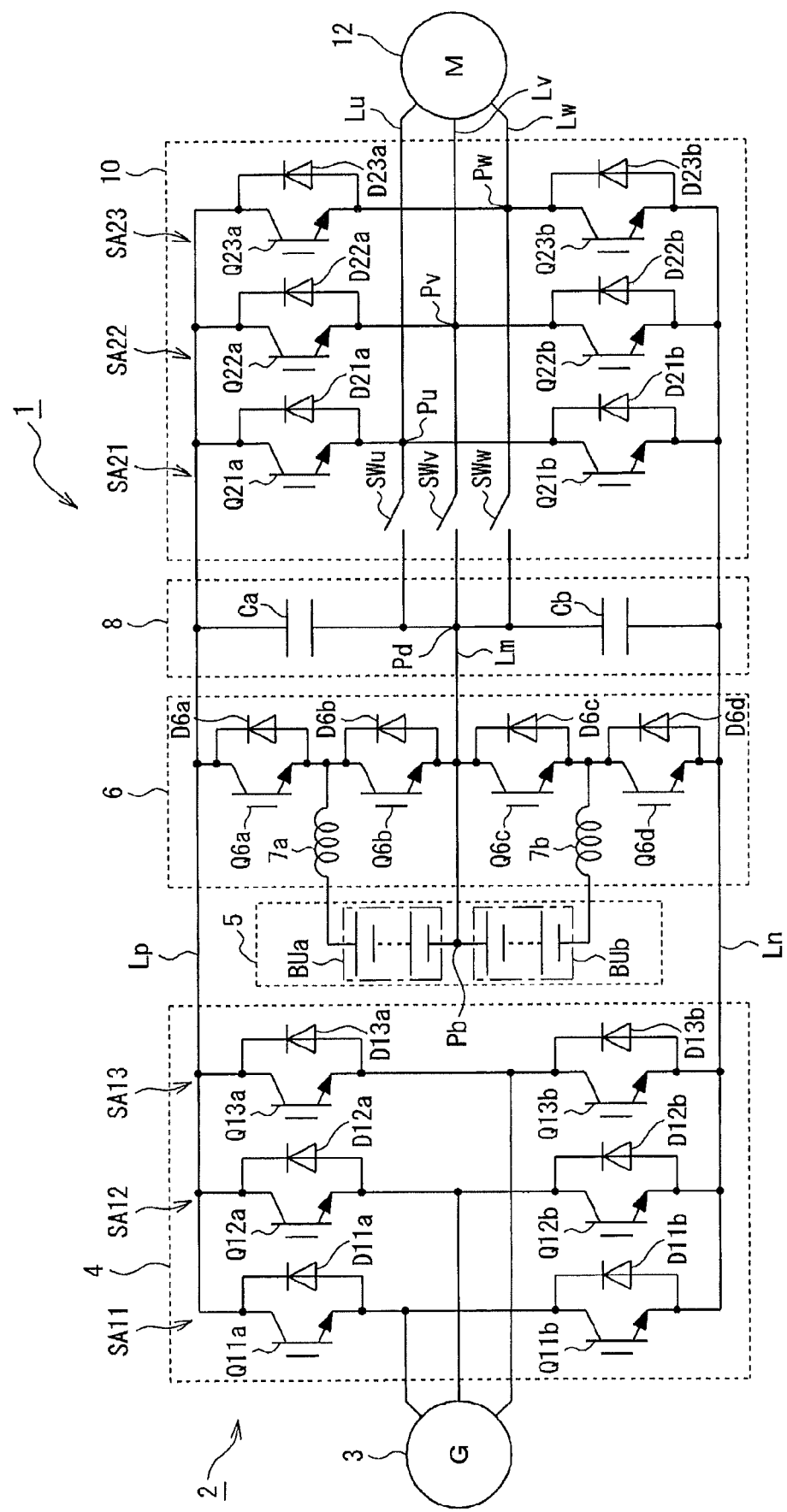
FIG. 1 is a block diagram showing a circuit configuration of a first embodiment of an electric power converter according to the invention.

FIG. 1 is a block diagram showing a circuit configuration of a first embodiment of an electric converter according to the invention. In FIG. 1, reference numeral 1 denotes an electric power converter applied to a hybrid electric vehicle. The electric power converter 1 has a DC power supply section 2 that outputs DC electric power by electric power generation. The DC power supply section 2 is provided with an AC generator 3 coupled to an output shaft of an internal combustion engine such as an auto engine and an AC to DC converter section 4 formed with an AC to DC converter circuit that converts three-phase AC electric power outputted from the AC generator 3 to DC electric power.

The AC to DC converter section 4 has three switching arms SA11 to SA13 connected in parallel to one another between a positive electrode side line Lp and a negative electrode side line Ln. The switching arms SA11 to SA13 have their respective pairs of switching devices Qia and Qib (i=11 to 13) each being formed with, for example, an insulated gate bipolar transistor (IGBT). The switching devices Qia and Qib in each of the pairs are connected in series between the positive electrode side line Lp and the negative electrode side line Ln. Moreover, the switching devices Qia to Qib have diodes Dia to Dib, respectively, connected in inverse-parallel thereto. Furthermore, to each of the connection points of the paired switching devices Qia and Qib, AC electric power of the AC generator 3 is supplied.

Moreover, the electric power converter 1 has a battery 5 in which at least two sets of battery units BUa and BUb are connected in series. The DC electric power of the battery 5 is outputted to the positive electrode side line Lp and the negative electrode side line Ln with the voltage of the battery 5 raised in a DC to DC converter section 6. Furthermore, from the connection point of the battery units BUa and BUb, an intermediate potential line Lm is derived that becomes a short circuit. Here, the battery units BUa and BUb, each with tens of unit batteries, each having an output voltage of several volts, connected in series, output a battery voltage Vb of hundreds of volts in total.

The DC to DC converter section 6 is formed with a step-up chopper circuit having a pair of switching devices Q6a and Q6b, each formed by an IGBT, for example, connected in series between the positive electrode side line Lp and the intermediate potential line Lm and a pair of switching devices Q6c and Q6d, each formed by an IGBT, for example, connected in series between the intermediate potential line Lm and the negative electrode side line Ln. To the switching devices Q6a to Q6d, diodes D6a to D6d are connected, respectively, in inverse-parallel. Moreover, to the connection point of the switching devices Q6a and Q6b, the positive electrode side of the battery 5 is connected through a step-up reactor 7a and to the connection point of the switching devices Q6c and Q6d, the negative electrode side of the battery 5 is connected through a step-up reactor 7b.

Furthermore, between the positive electrode side line Lp and the negative electrode side line Ln, a DC circuit 8 is connected in parallel to the DC to DC converter section 6. The DC circuit 8 has a pair of DC link capacitors Ca and Cb connected in series between the positive electrode side line Lp and the negative electrode side line Ln. The connection point of the DC link capacitors Ca and Cb is connected to the intermediate potential line Lm to form a short circuit.

Figure 2A:
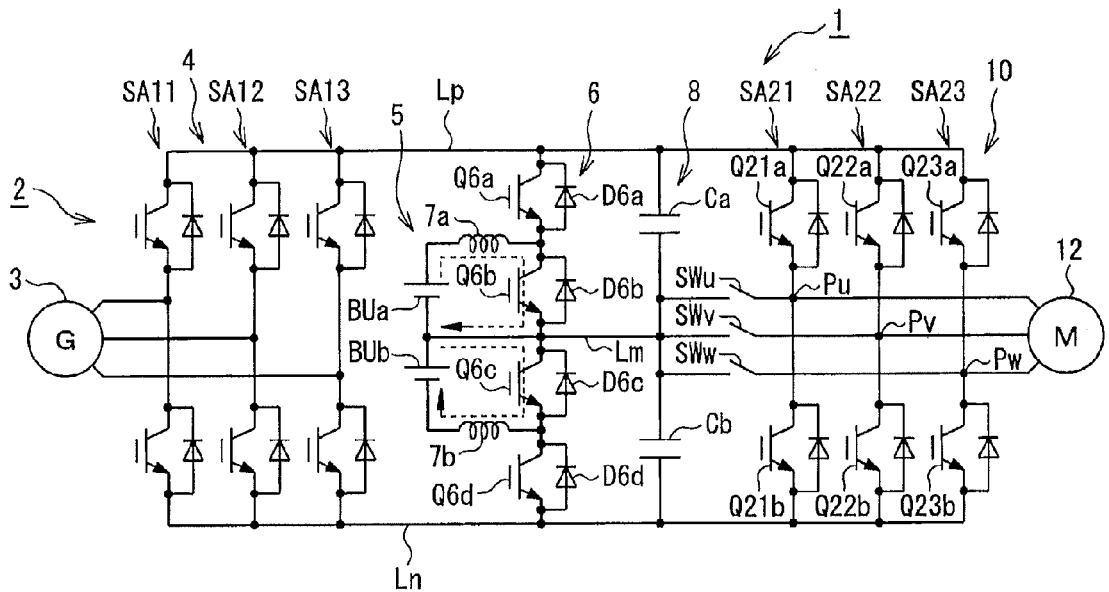
FIG. 2A and 2B are block diagrams illustrating a step-up operation of a DC to DC converter section in the first embodiment of the electric power converter according to the invention.
Figure 2B:
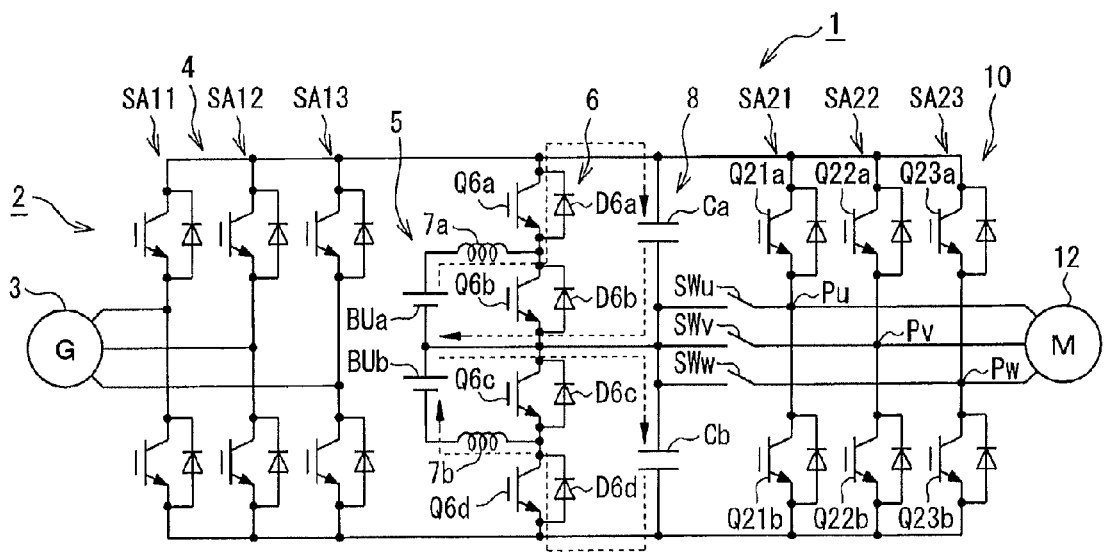

FIG. 2A and 2B are block diagrams illustrating a step-up operation of the DC to DC converter section 6 in the first embodiment of the electric power converter according to the invention.

Here, in the DC to DC converter section 6, as shown in FIG. 2A, with each of the switching devices Q6b and Q6c being brought into a turned-on state, energy is stored in the step-up reactors 7a and 7b. From this state, by bringing each of the switching devices Q6b and Q6c into a turned-off state and, along with this, by bringing the switching devices Q6a and Q6d into a turned-on state as shown in FIG. 2B, the energy stored in the step-up reactors 7a and 7b is released to charge the capacitors Ca and Cb in the DC circuit 8. By selecting the period of turning-on and turning-off each of the switching devices Q6a to Q6d, the battery voltage Vb/2 is raised to be capable of charging the capacitors Ca and Cb.

Still further, between the positive electrode side line Lp and the negative electrode side line Ln, a DC to AC converter section 10 is connected which forms an inverter circuit as an electric power converter section converting DC electric power to AC electric power. The DC to AC converter section 10 has three switching arms SA21 to SA23 connected in parallel to one another between the positive electrode side line Lp and the negative electrode side line Ln. The switching arms SA21 to SA23 have their respective pairs of switching devices Qja and Qjb (j=21 to 23) each being formed with, for example, an IGBT. The switching devices Qja and Qjb in each of the pairs are connected in series between the positive electrode side line Lp and the negative electrode side line Ln. Moreover, the switching devices Qja to Qjb have diodes Dja to Djb, respectively, connected in inverse-parallel thereto. Furthermore, connection points of the paired switching devices Qja and Qjb are made to serve as AC output points Pu, Pv and Pw, which are connected to an AC motor 12 as a load. Along with this, the AC output points Pu, Pv and Pw are connected to an intermediate potential point Pd in the DC circuit 8 through bilateral switching circuits SWu, SWv and SWw, respectively.

Figure 3A:
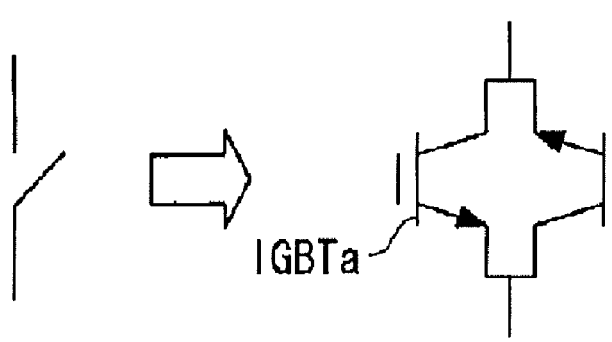
FIG. 3A and 3B are circuit diagrams showing examples of configurations of bilateral switching circuits which can be applied to the first embodiment of the electric power converter according to the invention.
Figure 3B:
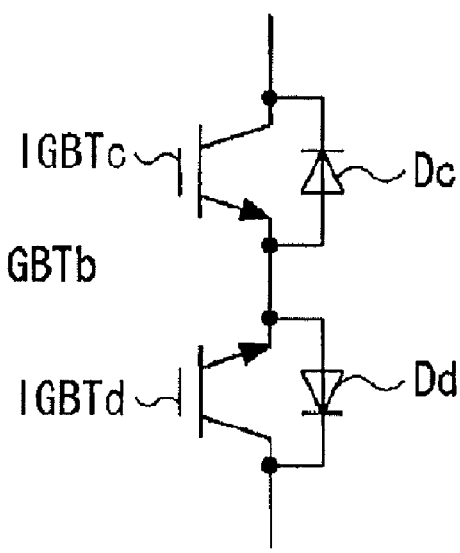
Figure 4:
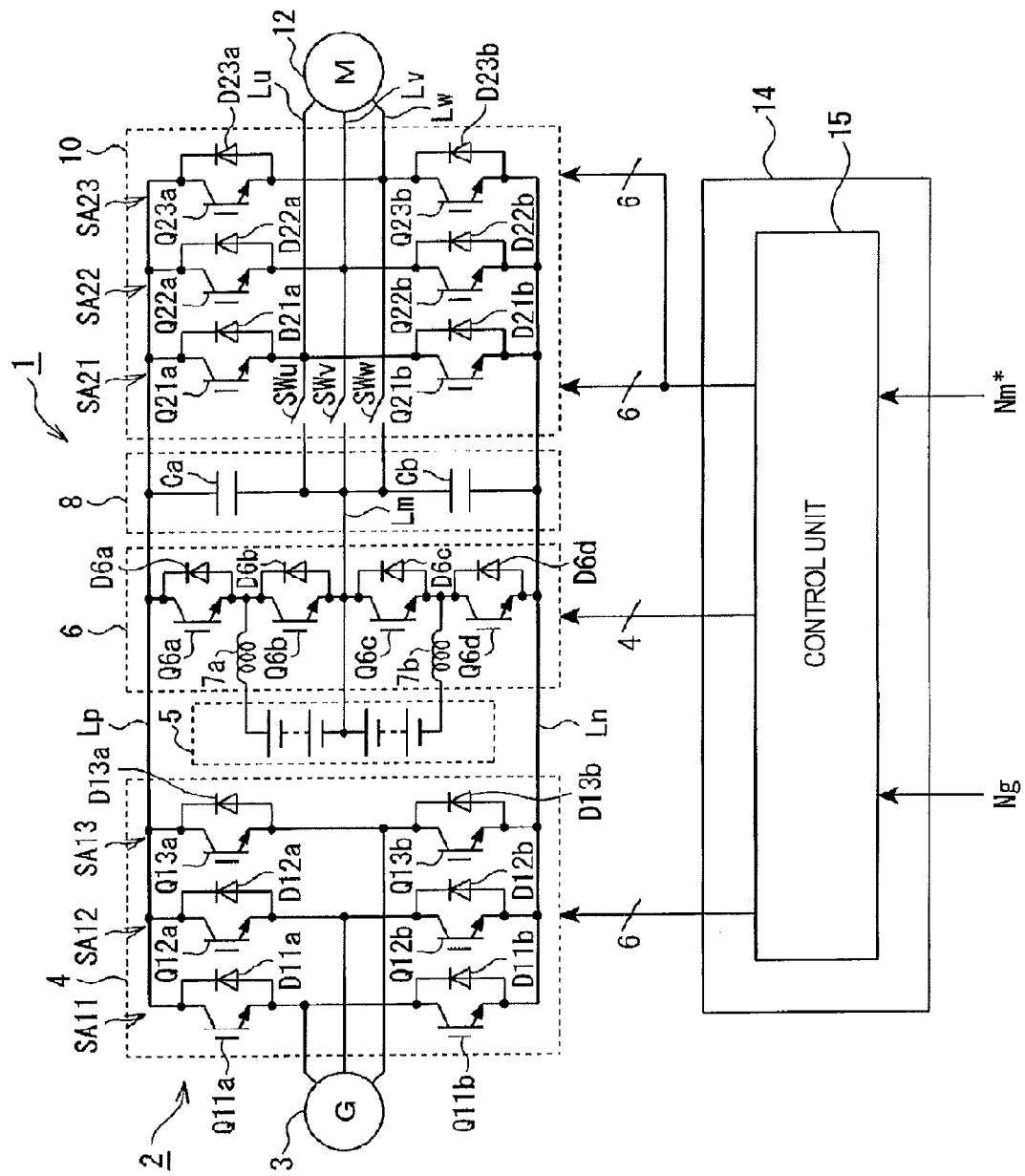
FIG. 4 is a block diagram showing the first embodiment of the electric power converter according to the invention with a control unit included.

FIG. 3A and 3B are circuit diagrams showing examples of configurations of bilateral switching circuits which can be applied to the first embodiment of the electric power converter according to the invention, and FIG. 4 is a block diagram showing the first embodiment of the electric power converter according to the invention with a control unit included.

Here, for the bilateral switching circuits SWu to SWw, it is preferable to apply a configuration in which an IGBTa and an IGBTb each having a reverse-blocking characteristic are connected in inverse-parallel as shown in FIG. 3A, or to apply a configuration in which an IGBTc and an IGBTd each having no reverse-blocking characteristic are connected in series with a diode Dc and a diode Dd connected in inverse-parallel to the IGBTc and the IGBTd, respectively, as shown in FIG. 3B.

Then, PWM control of the switching devices in the AC to DC converter section 4, the DC to DC converter section 6 and the DC to AC converter section 10 is carried out by a control unit 15 in a control system 14 shown in FIG. 4. Here, to the control unit 15, a rotating speed instruction (or a frequency instruction) value Nm* for the AC motor 12 is inputted. Along with this, a rotating speed detection value Ng is also inputted. On the basis of the rotating speed instruction (or a frequency instruction) value Nm* and the rotating speed detection value Ng, on-off instruction signals are formed for the switching devices.

Next, an operation of the first embodiment will be explained.

First, an explanation will be made about the case of making the DC to AC converter section 10 carry out operation in a four switching device operation control mode.

Figure 5A:
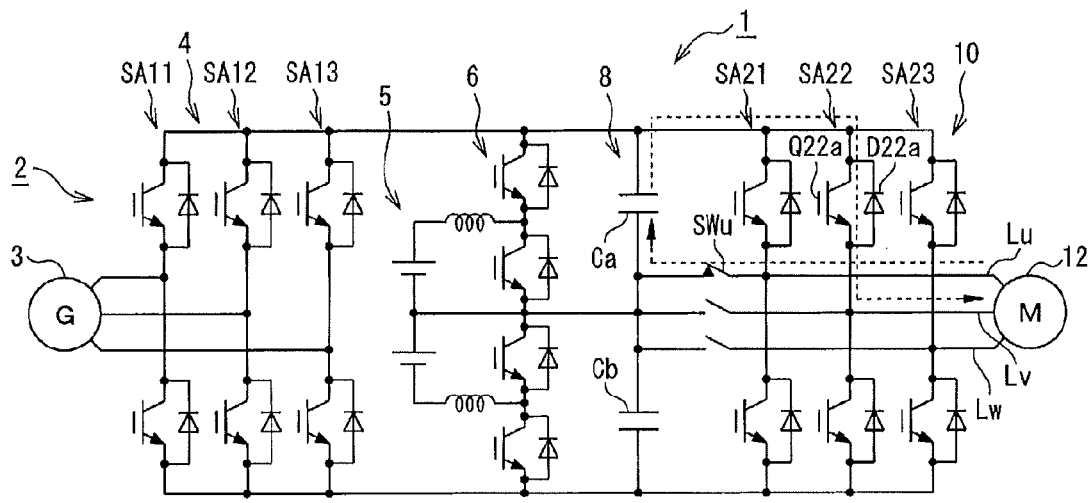
FIG 5A, 5B and 5C are block diagrams illustrating operations in a four switching device operation control mode in the first embodiment.
Figure 5B:
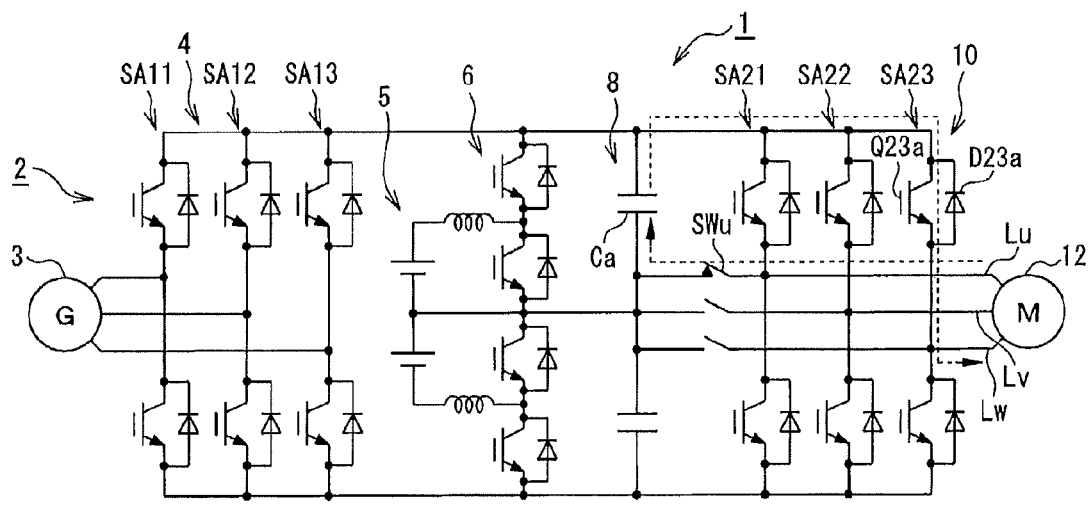
Figure 5C:
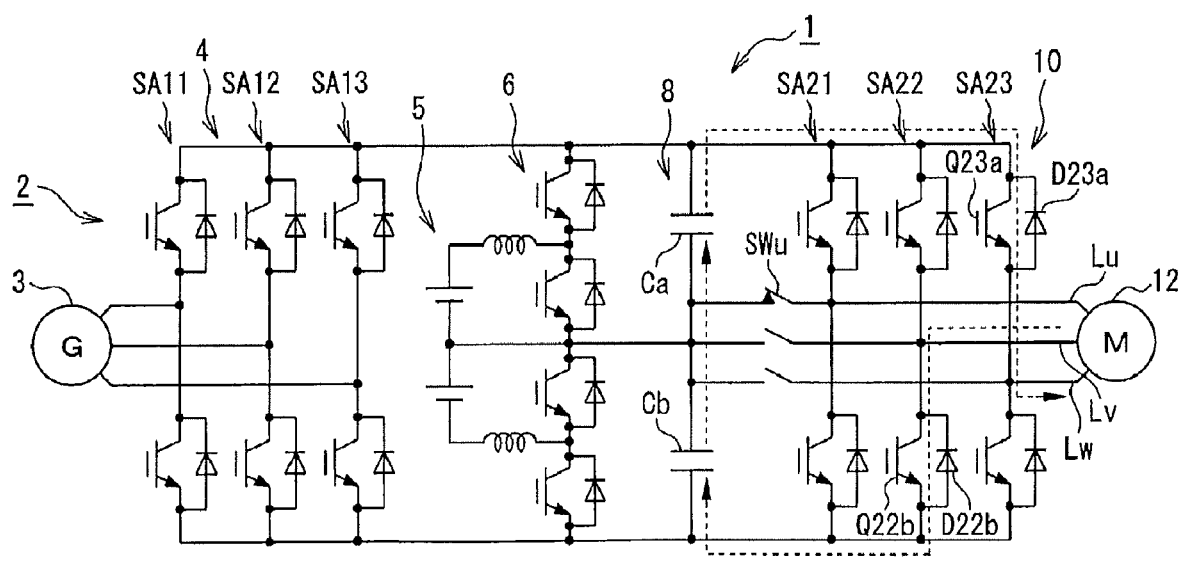
Figure 6A:
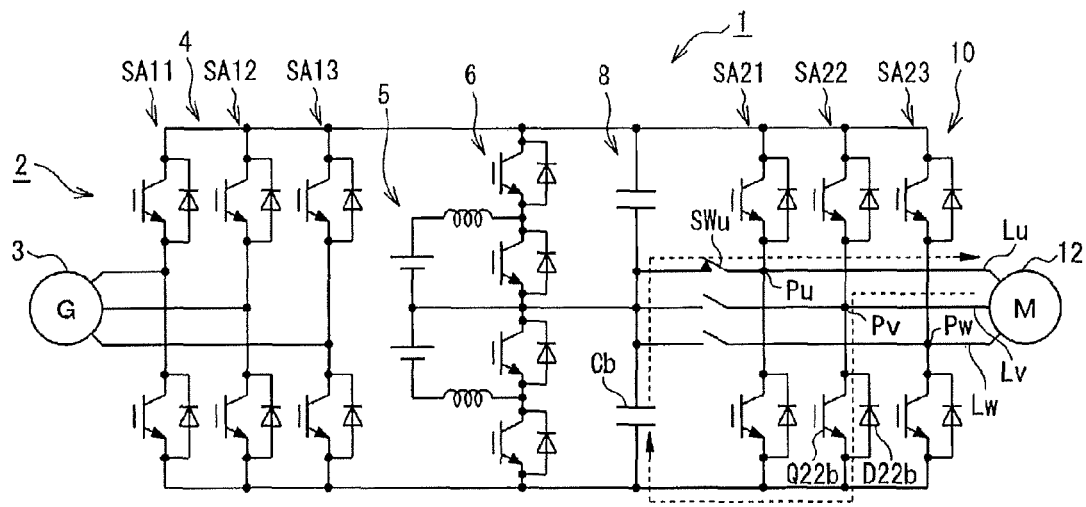
FIG. 6A, 6B and 6C are block diagrams illustrating operations in the four switching device operation control mode subsequent to those shown in FIG. 5A, 5B and 5C in the first embodiment.
Figure 6B:
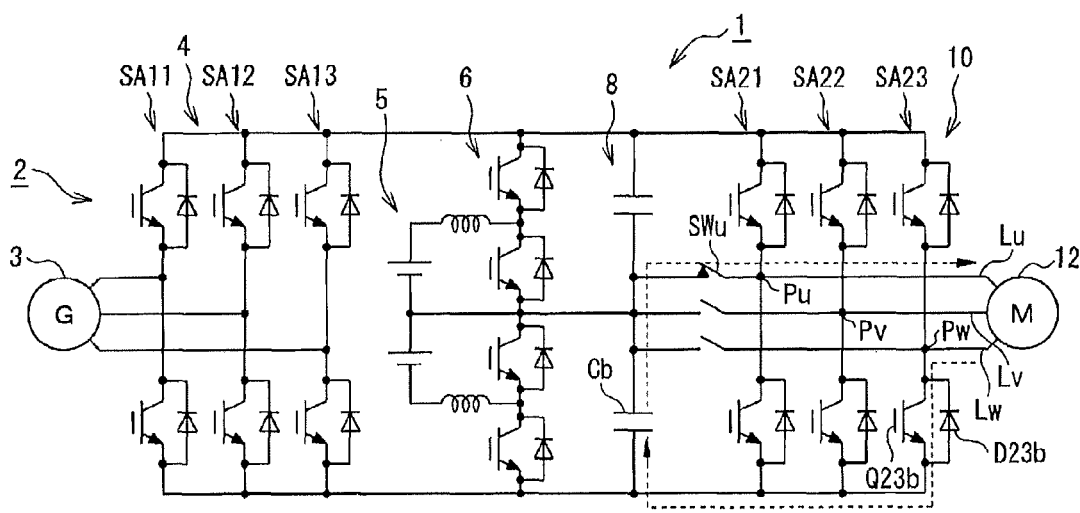
Figure 6C:
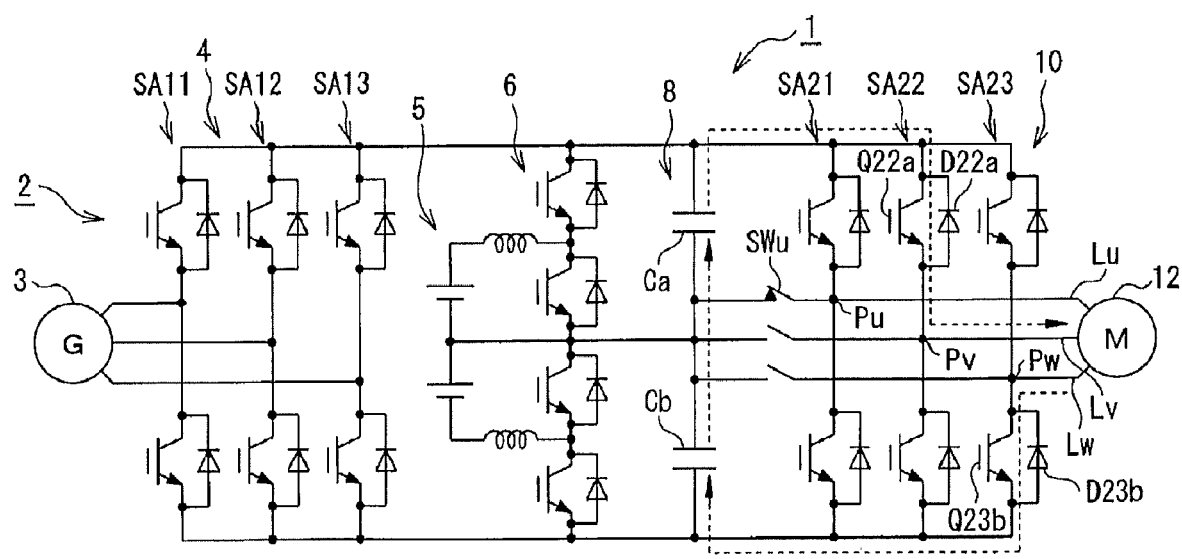

FIG. 5A, 5B and 5C are block diagrams illustrating operations in the four switching device operation control mode in the first embodiment, and FIG. 6A, 6B and 6C are block diagrams illustrating operations in the four switching device operation control mode subsequent to those shown in FIG. 5A, 5B and 5C in the first embodiment.

Now, when the AC motor 12 is operated at a low speed, as shown in FIG. 5, of the three switching arms SA21 to SA 23 corresponding to their respective phases of three phase AC outputs, in a switching arm for any one phase in the DC to AC converter section 10, the switching arm SA21 for u-phase, for example, the bilateral switching circuit SWu, inserted as a bilateral switching device between the AC output point Pu of the switching arm SA21 and the intermediate potential point Pd in the DC circuit 8, is to be brought into a closed state and the rest bilateral switching circuits SWv and SWw as bilateral switching devices are to be brought into an open state. Furthermore, the switching devices Q21a and Q21b in the DC to AC converter section 10 are controlled to be in normally turned-off states and the rest switching devices Q22a to Q23b are controlled to be also in temporarily turned-off states.

In this state, by controlling the switching device Q22a in the DC to AC converter section 10 to be brought into a turned-on state, as shown in FIG. 5A, a path of a discharged current is formed from the positive electrode side of the DC link capacitor Ca in the DC circuit 8 to the winding Lv of the AC motor 12 through the switching device Q22a and the AC output point Pv and from the winding Lu of the AC motor 12 to the negative electrode side of the DC link capacitor Ca in the DC circuit 8 through the AC output point Pu and the bilateral switching circuit SWu. This, letting the capacities of the capacitors Ca and Cb in the DC circuit 8 be determined to be equal to each other, makes a voltage of Ed/2, one-half of a DC voltage Ed across the terminals of the DC circuit 8, applied between the windings Lu and Lv.

Then, as shown in FIG. 5B, by controlling the switching device Q22a in the DC to AC converter section 10 to be brought into a turned-off state and controlling the switching device Q23a to be brought into a turned-on state instead, a path of a discharged current is formed from the positive electrode side of the DC link capacitor C in the DC circuit 8 to the winding Lw of the AC motor 12 through the switching device Q23a and the AC output point Pw and the AC output point Pw and from the winding Lu to the negative electrode side of the DC link capacitor Ca through the AC output point Pu and the bilateral switching circuit SWu. This makes a DC voltage of Ed/2, one-half of a DC voltage Ed of the DC circuit 8, applied between the windings Lw and Lu.

Following this, as shown in FIG. 5C, with the turned-on state of the switching device Q23a in the DC to AC converter section 10 being kept continuously, by bringing the switching device Q22b into a turned-on state, a path of a discharged current is formed from the positive electrode side of the DC link capacitor Ca in the DC circuit 8 to the winding Lw through the switching device Q23a and the AC output point Pw, from the winding Lv to the negative electrode side of the DC link capacitor Cb in the DC circuit 8 through the AC output point Pv and the switching device Q22b and from the positive electrode side of the DC link capacitor Cb to the negative electrode side of the DC link capacitor Ca. This makes the DC voltage Ed of the DC circuit 8 applied between the windings Lw and Lu.

Subsequent to this, as shown in FIG. 6A, with the turned-on state of the switching device Q22b being kept continuously, by bringing the switching device Q23a into a turned-off state, a negative side path of a discharged current is formed from the positive electrode side of the DC link capacitor Cb in the DC circuit 8 to the winding Lu of the AC motor 12 through the bilateral switching circuit SWu and the AC output point Pu and from the winding Lv to the negative electrode side of the DC link capacitor Cb through the AC output point Pv and the switching device Q22b. This makes a voltage of -Ed/2 applied between the windings Lu and Lv.

Next, as shown in FIG. 6B, by bringing the switching device Q22b into a turned-off state and bringing the switching device Q23b into a turned-on state instead, a path of a discharged current is formed from the positive electrode side of the DC link capacitor Cb to the winding Lu of the AC motor 12 through the bilateral switching circuit SWu and the AC output point Pu and from the winding Lw to the negative electrode side of the DC link capacitor Cb through the AC output point Pw and the switching device Q23b. This makes a voltage of -Ed/2 applied between the windings Lu and Lw.

Following this, as shown in FIG. 6C, with the turned-on state of the switching device Q23b being kept continuously, by bringing the switching device Q22a into a turned-on state, a path of a discharged current is formed from the positive electrode side of the DC link capacitor Ca in the DC circuit 8 to the winding Lv of the AC motor 12 through the switching device Q22a and the AC output point Pv and from the winding Lw to the negative electrode side of the DC link capacitor Ca through the AC output point Pw, the switching device Q23b, and the negative side and positive side of the DC link capacitor Cb. This makes a DC voltage Ed applied between the windings Lv and Lw.

By repeating the control operation control mode shown in FIG. 5A to FIG. 6C, the AC motor 12 can be driven to rotate at a low speed with the use of four switching devices of the six switching devices in the DC to AC converter section 10.

When the AC motor 12 is operated with the use of the four switching devices, a low voltage is applied to the AC motor 12. Thus, controlling carried out for keeping a constant ratio of the input voltage of the DC to AC converter section 10 to the output frequency of the DC to AC converter section 10 (constant V/f control) makes it impossible to increase the output frequency of the DC to AC converter section 10 because of a low voltage applied to the AC motor 12. Thus, there is a demerit of making a high speed operation of the AC motor 12 impossible. While, the small numbers of switching devices actually carrying out switching and devices actually brought into conduction allow conduction losses to be decreased and, along with this, in the section two thirds of one period of the AC output, compared with the DC voltage Ed in the DC circuit 8, voltages applied to the switching devices Q22a, Q22b, Q23a and Q23b become Ed/2. Thus, there is a merit of decreasing switching losses of the switching devices.

Furthermore, the voltage applied to the AC motor 12 also becomes equivalent to one-half of the DC voltage Ed of the DC circuit 8 in the section two thirds of one period of the AC output. This decreases the ripples in the current flowing in the AC motor 12 to enable reduction of harmonic losses in the AC motor 12.

In the next, an explanation will be made about the case of making the DC to AC converter section 10 carry out an operation in a three-level operation control mode.

Figure 7A:
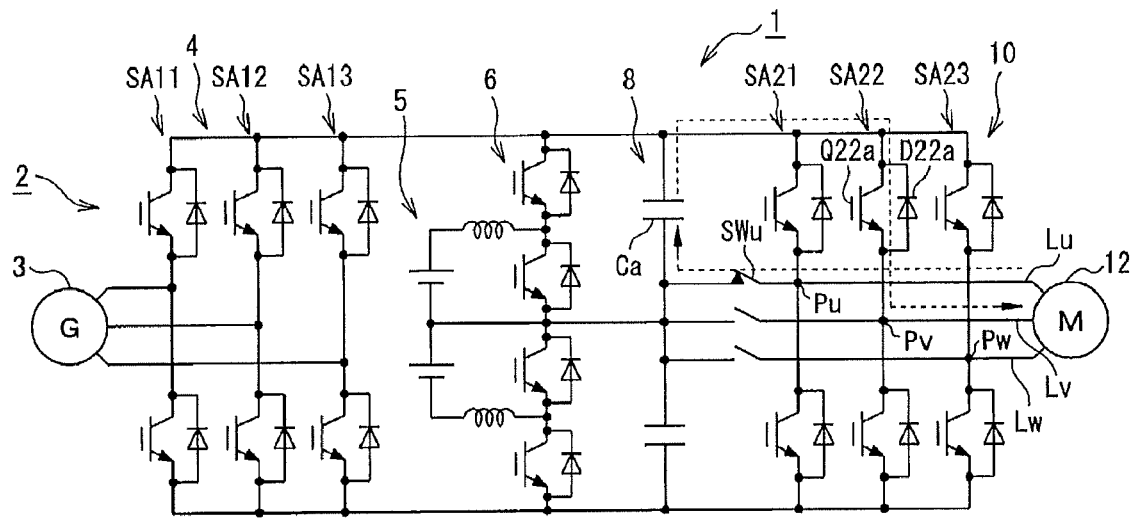
FIG. 7A, 7B and 7C are block diagrams illustrating operations in a three-level operation control mode in the first embodiment.
Figure 7B:
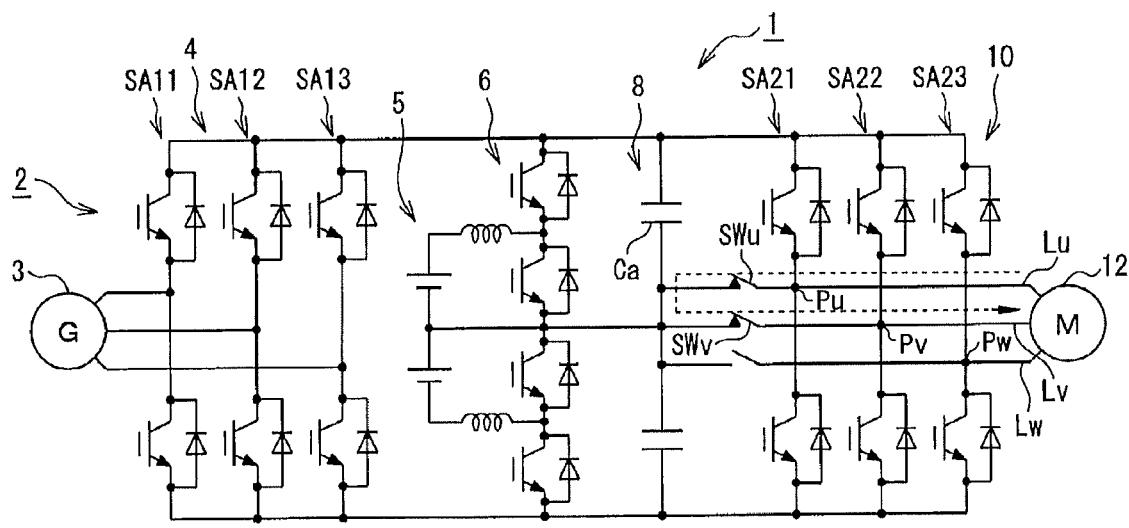
Figure 7C:
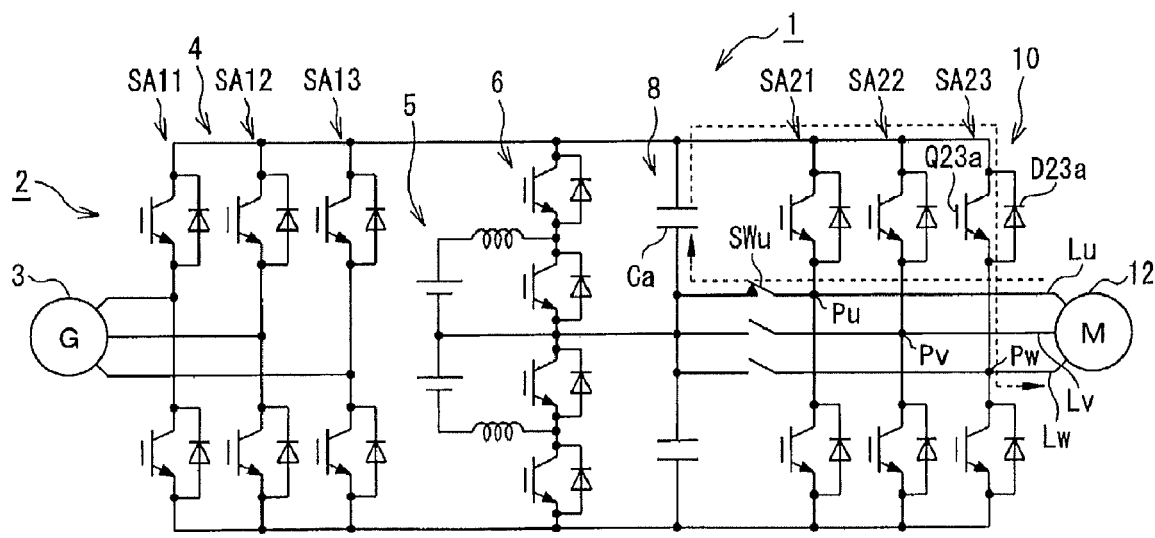
Figure 8A:
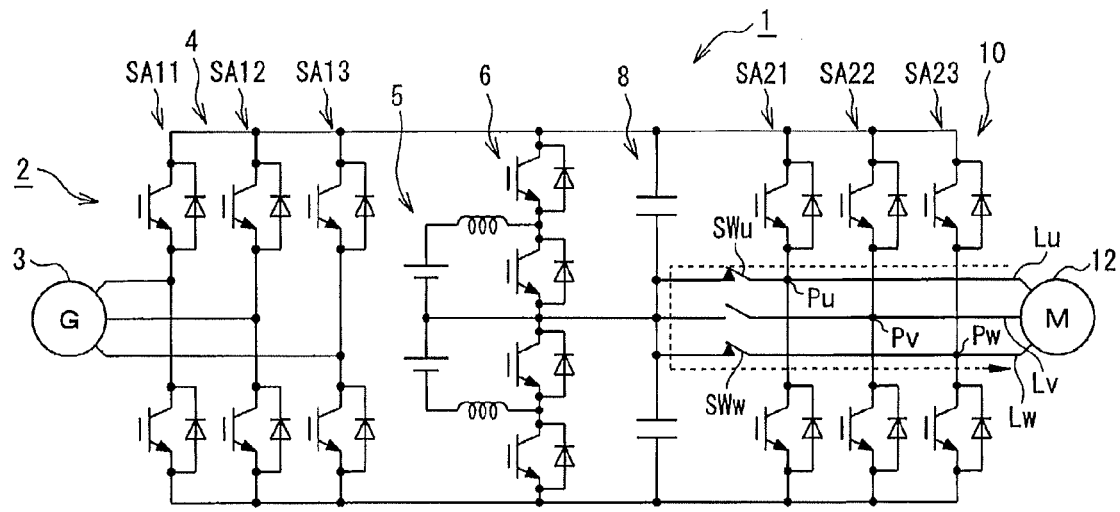
FIG 8A, 8B and 8C are block diagrams illustrating operations in the three-level operation control mode subsequent to those shown in FIG. 7A, 7B and 7C in the first embodiment.
Figure 8B:
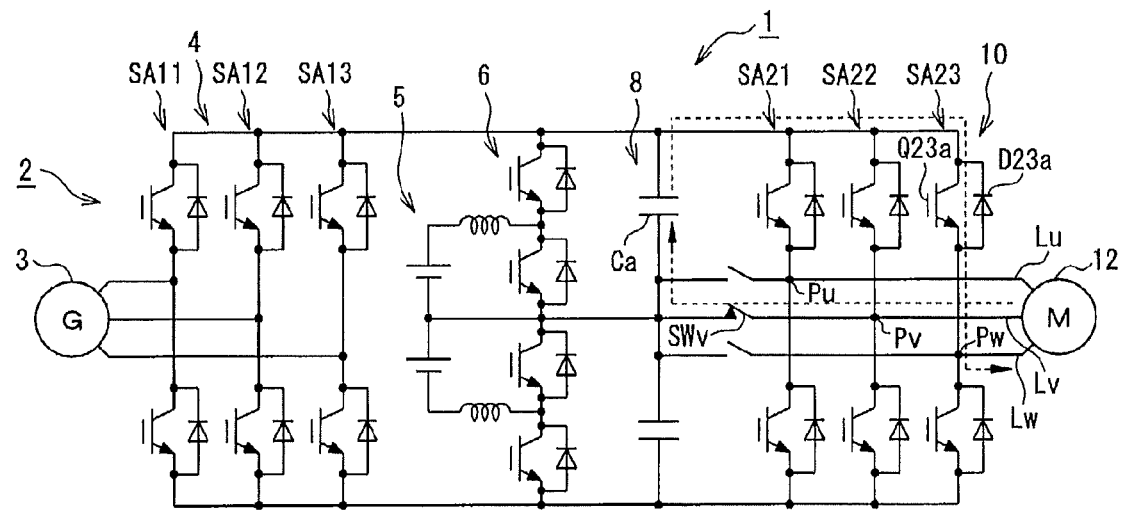
Figure 8C:
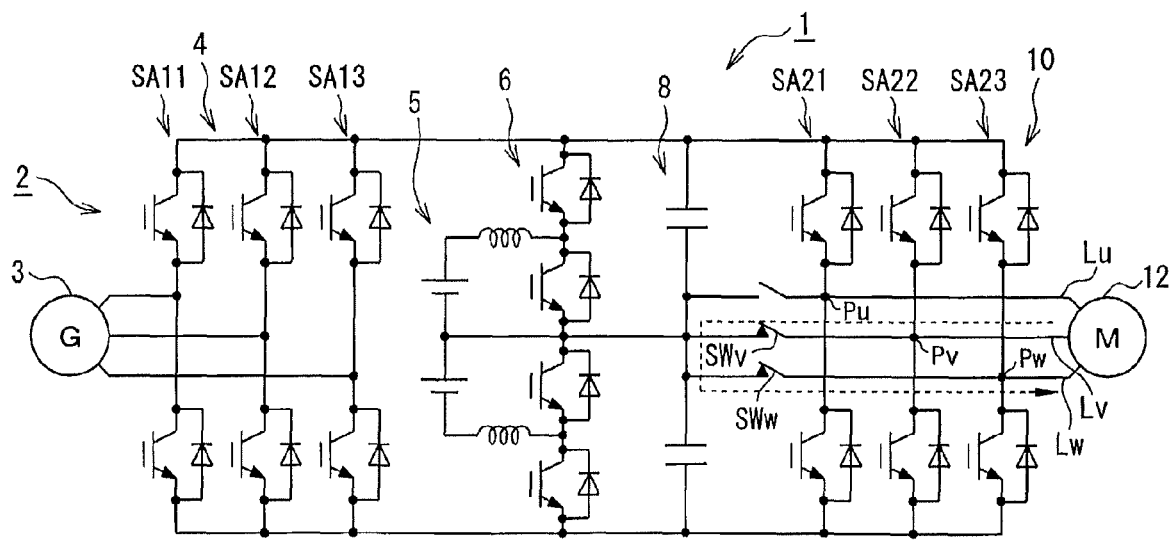

FIG. 7A, 7B and 7C are block diagrams illustrating operations in a three-level operation control mode in the first embodiment, and FIG. 8A, 8B and 8C are block diagrams illustrating operations in the three-level operation control mode subsequent to those shown in FIG. 7A, 7B and 7C in the first embodiment.

For making the DC to AC converter section 10 carry out an operation in a three-level operation control mode, as shown in FIG. 7A to FIG. 8C, on-off control of the switching devices Q21a to Q23b and the bilateral switching circuits SWu to SWw is carried out.

Namely, explanations will be made about an operation in the section one-half of a period (½period) of the output on the positive electrode side in the three-level operation control mode. First, as shown in FIG. 7A, by bringing the bilateral switching circuit SWu into a turned-on state and, along with this, bringing the switching device Q22a into a turned-on state, a path of a discharged current is formed from the positive electrode side of the DC link capacitor Ca in the DC circuit 8 to the winding Lv of the AC motor 12 through the switching device Q22a and the AC output point Pv and from the winding Lu to the intermediate potential side of the DC link capacitor Ca through the AC output point Pu and the bilateral switching circuit SWu.

Then, as shown in FIG. 7B, by bringing the switching device Q22a into a turned-off state with the turned-on state of the bilateral switching circuit SWu being kept continuously, and bringing the bilateral switching circuit SWv into a turned-on state instead, both ends of the windings Lu and Lv of the AC motor 12 are connected to be at an intermediate potential.

Following this, as shown in FIG. 7C, by bringing the bilateral switching circuit SWw into a turned-off state with the turned-on state of the bilateral switching circuit SWu being kept continuously, and bringing the switching device Q23a into a turned-on state instead, a path of a discharged current is formed from the positive electrode side of the DC link capacitor Ca in the DC circuit 8 to the winding Lw of the AC motor 12 through the switching device Q23a and the AC output point Pw and from the winding Lu to the intermediate potential side of the DC link capacitor Ca through the AC output point Pu and the bilateral switching circuit SWu.

Next, as shown in FIG. 8A, the switching device Q23a is brought into a turned-off state with the turned-on state of the bilateral switching circuit SWu being kept continuously, and the bilateral switching circuit SWw is brought into a turned-on state instead, by which both ends of the windings Lu and Lw of the AC motor 12 are connected to be at an intermediate potential.

Subsequent to this, as shown in FIG. 8B, with both of the bilateral switching circuits SWu and SWw brought into turned-off states, the bilateral switching circuit SWv is brought into a turned-on state instead and the switching device Q23a is brought into a turned-on state, by which a path of a discharged current is formed from the positive electrode side of the DC link capacitor Ca in the DC circuit 8 to the winding Lw through the switching device Q23a and the AC output point Pw and from the winding Lv to the intermediate potential side of the DC link capacitor Ca through the AC output point Pv and the bilateral switching circuit SWv.

Following this, as shown in FIG. 8C, by bringing the switching device Q23a into a turned-off state with the turned-on state of the bilateral switching circuit SWv being kept continuously, and bringing the bilateral switching circuit SWw into a turned-on state instead, both ends of the windings Lv and Lw of the AC motor 12 are connected to be at an intermediate potential.

Figure 9:
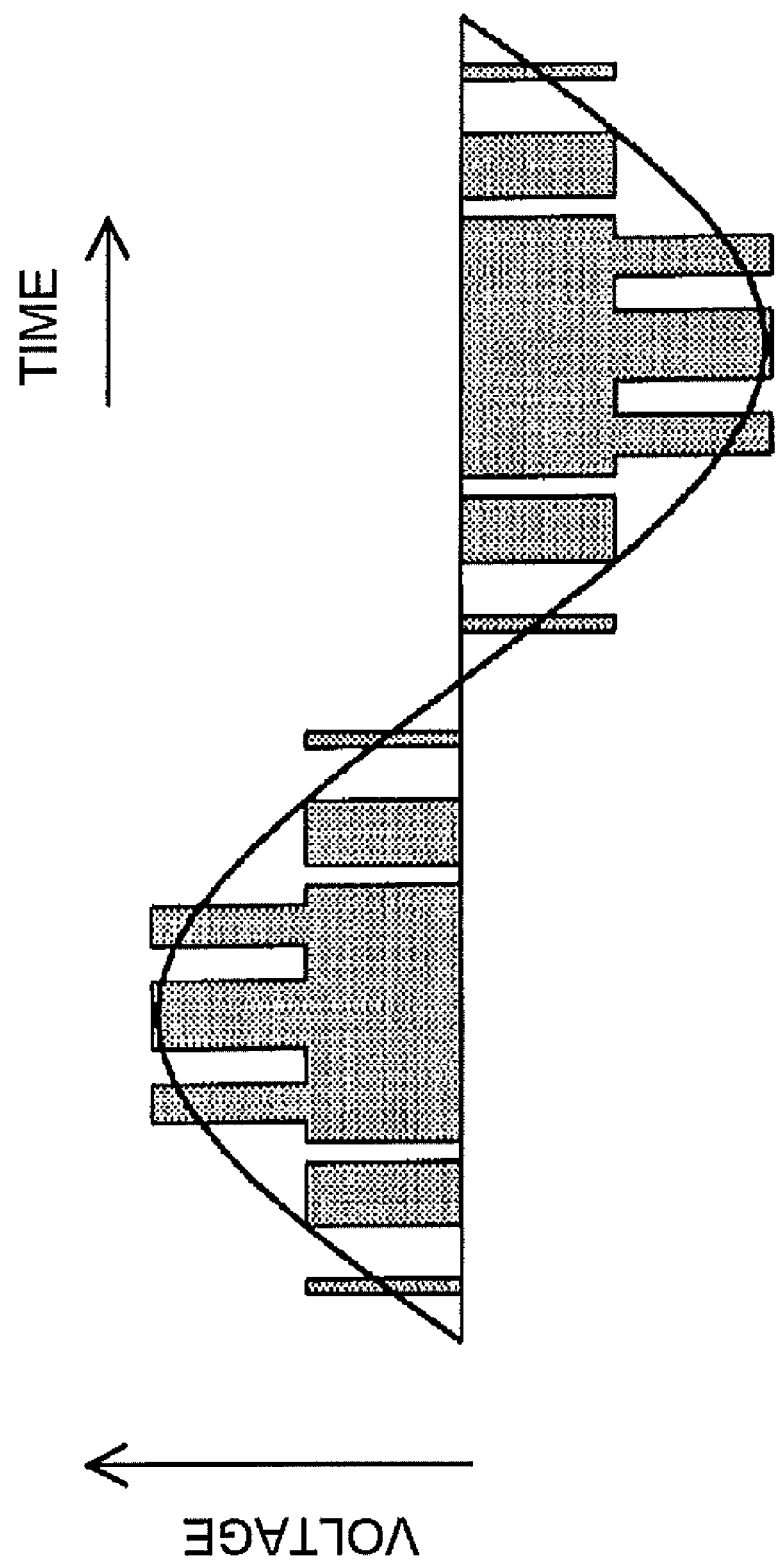
FIG. 9 is a waveform diagram showing a line-to-line voltage waveform of an AC output at the operation in the three-level operation control mode.

By carrying out on-off control of the switching devices and the bilateral switching circuits in this way, a line-to-line voltage waveform of an AC output at the operation in the three-level operation control mode can be obtained as shown in FIG. 9.

In the operation in the three-level operation control mode, the switching of each of the switching devices Q21a to Q23b is carried out under a voltage of Ed/2, one-half of the DC voltage Ed of the DC circuit 8. Therefore, a switching loss is reduced and, along with this, because of the operation in the three-level operation control mode, also in the voltage applied to the AC motor 12, lower order harmonic components are decreased as shown in FIG. 9 to also enable reduction in harmonic losses in the AC motor 12.

Next, a two-level operation control mode will be explained which is applied to the DC to AC converter section 10 at a high speed operation.

Figure 10A:
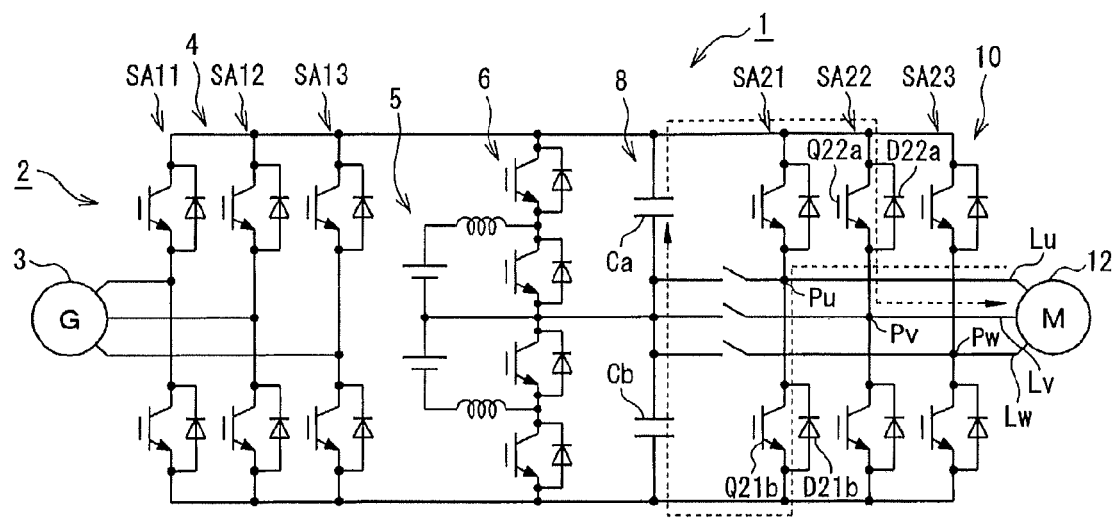
FIG. 10A, 10B and 10C are block diagrams illustrating operations in a two-level operation control mode in the first embodiment.
Figure 10B:
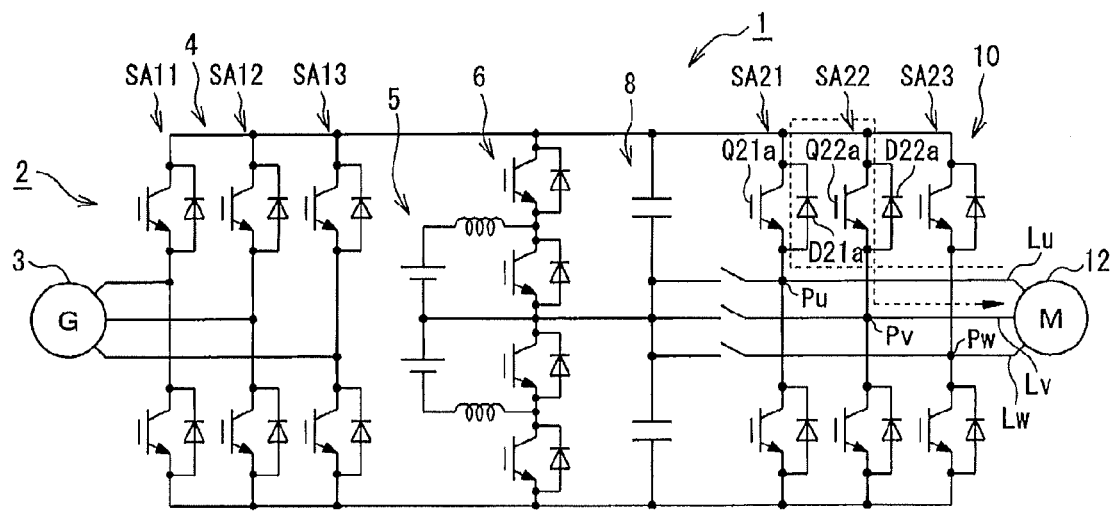
Figure 10C:
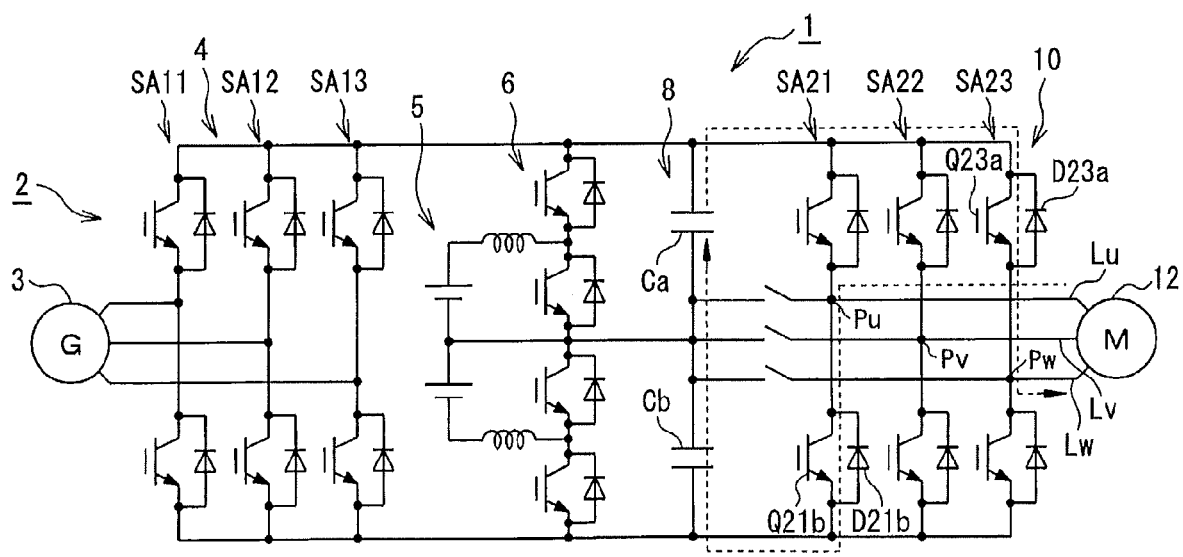
Figure 11A:
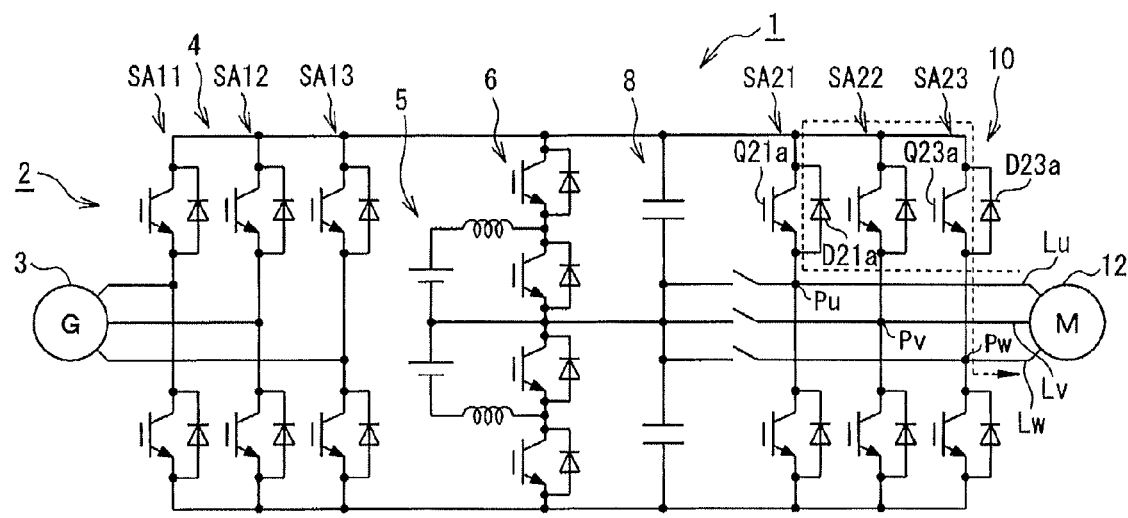

FIG. 10A, 10B and 10C are block diagrams illustrating operations in the two-level operation control mode in the first embodiment, and FIG. 11A, 11 B and 11 C are block diagrams illustrating operations in the two-level operation control mode subsequent to those shown in FIG. 10A, 10B and 10C in the first embodiment.

In the operation in the two-level operation control mode, the switching devices Q21a to Q23b are subjected to on-off control (PWM control) with all of the bilateral switching circuits SWu to SWw being made to be in turned-off states, i.e. opened states, by which the AC motor 12 is driven at a high speed.

Namely, operations in the two-level operation control mode in the section one-half of a positive period (½period) of an output will be explained in the following. First, as shown in FIG. 10A, by bringing the switching devices Q22a and Q21b into a turned-on state, a path of a discharged current is formed from the positive electrode side of the DC link capacitor Ca in the DC circuit 8 to the winding Lv through the switching device Q22a and the AC output point Pv and from the winding Lu to the intermediate potential side of the DC link capacitor Ca through the AC output point Pu, the switching device Q21b and the negative electrode side and the intermediate potential side of the DC link capacitor Cb.

Then, as shown in FIG. 10B, by bringing the switching device Q21b into a turned-off state while keeping the switching device Q22a in the turned-on state, and bringing the switching device Q21a into a turned-on state instead, the winding Lu and the winding Lv are connected through the switching devices Q22a and Q21a, by which a current circulation state is provided.

Next to this, as shown in FIG. 10 FIG. 10C, by bringing both of the switching devices Q21a and Q22a into turned-off states, and bringing both of the switching devices Q23a and Q21b into turned-on states instead, a path of a discharged current is formed from the positive electrode side of the DC link capacitor Ca in the DC circuit 8 to the winding Lw through the switching device Q23a and the AC output point Pw and from the winding Lu to the intermediate potential side of the DC link capacitor Ca through the AC output point Pu, the switching device Q21b and the DC link capacitor Cb.

Subsequent to this, as shown in FIG. 11A, by bringing the switching device Q21b into a turned-off state while keeping the switching device Q23a in the turned-on state, and bringing the switching device Q21a into a turned-on state instead, a current circulation state is formed from the winding Lu to the winding Lw through the switching devices Q21a and Q23a.

Figure 11B:
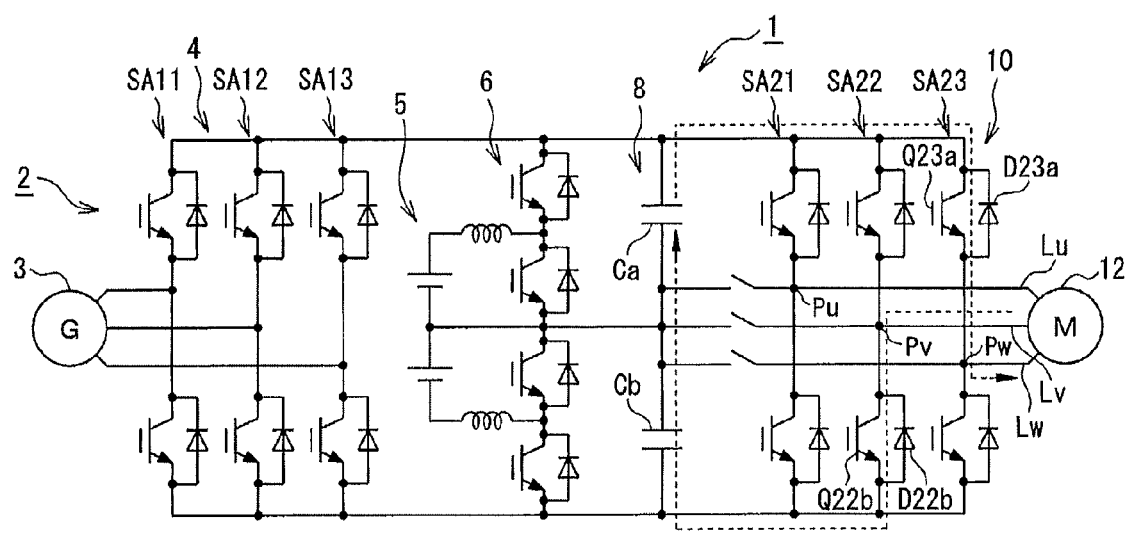

Following this, as shown in FIG. 11B, by bringing the switching device Q21a into a turned-off state while keeping the switching device Q23a in the turned-on state, and bringing the switching device Q22b into a turned-on state instead, a path of a discharged current is formed from the positive electrode side of the DC link capacitor Ca in the DC circuit 8 to the winding Lw through the switching device Q23a and the AC output point Pw and from the winding Lv to the intermediate potential side of the DC link capacitor Ca through the AC output point Pv, the switching device Q22b and the DC link capacitor Cb.

Figure 11C:
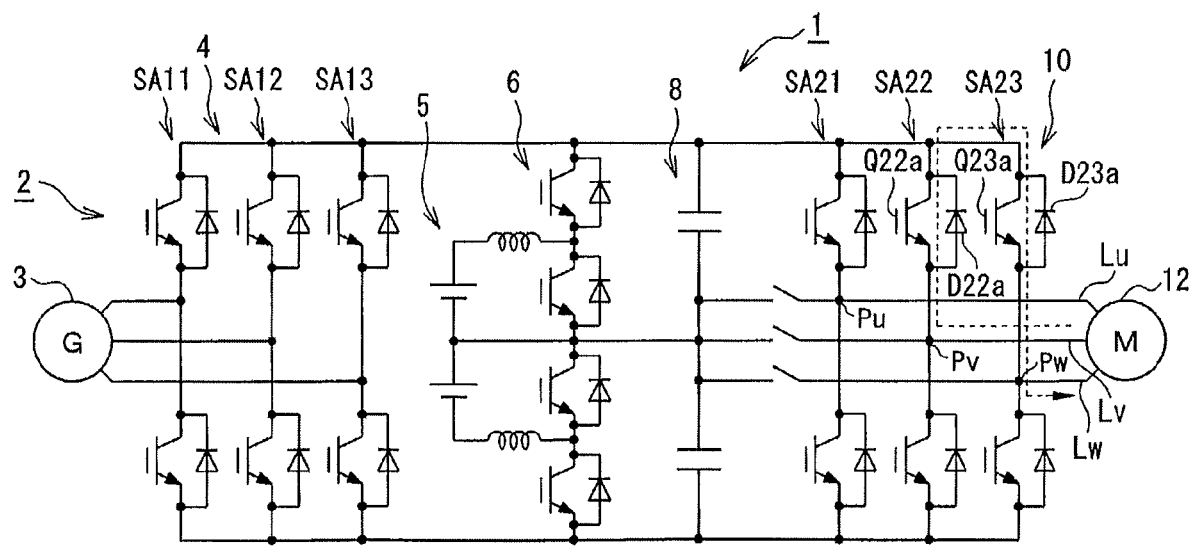

Next, as shown in FIG. 11C, by bringing the switching device Q22b into a turned-off state while keeping the switching device Q23a in the turned-on state, and bringing the switching device Q22a into a turned-on state instead, a current circulation path is formed from the winding Lu to the winding Lw through the switching devices Q21a and Q23a.

In this way, on-off control (PWM control) of the switching devices Q21a to Q23b is carried out to apply voltages of two levels, the levels of the DC voltage Ed of the DC circuit 8 and zero voltage, between the output lines, by which the AC motor 12 is driven. At this time, all of the bilateral switching circuits SWu to SWw are made to be in a normally turned-off state. When operating the AC motor 12 at a high speed, a rectangular wave operation is required, so that an operation in the two-level operation control mode is carried out which requires the fewest possible switching operations to enable a conduction loss to be reduced to a minimum.

As was explained in the foregoing, according to the first embodiment, the DC to AC converter section 10 can be operated with three kinds of operation control modes of the four switching device operation control mode, the three-level operation control mode and the two-level operation control mode. Therefore, when the rotating speed of the AC motor 12 is divided into two step speed regions of a low speed and a high speed for carrying out speed control about the respective speed regions, and when the rotating speed is divided into three step speed regions of a low speed, an intermediate speed and a high speed for carrying out speed control about the respective speed regions, the operation control modes can be used as shown in the table presented later.

Namely, when carrying out speed control about the two step speed regions of a low speed and a high speed, three cases can be considered, the case of using the four switching device operation control mode for a low speed region and using the two-level operation control mode for a high speed region, the case of using the three-level operation control mode for a low speed region and using the two-level operation control mode for a high speed region, and the case of using the four switching device operation control mode for a low speed region and using the three-level operation control mode for a high-speed region.

Moreover, when carrying out speed control about the three step speed regions of a low speed, an intermediate speed and a high speed, there can be considered the case of using the four switching device operation control mode for a low speed region, using the three-level operation control mode for an intermediate speed region and using the two-level operation control mode for a high speed region.

Figure 12:
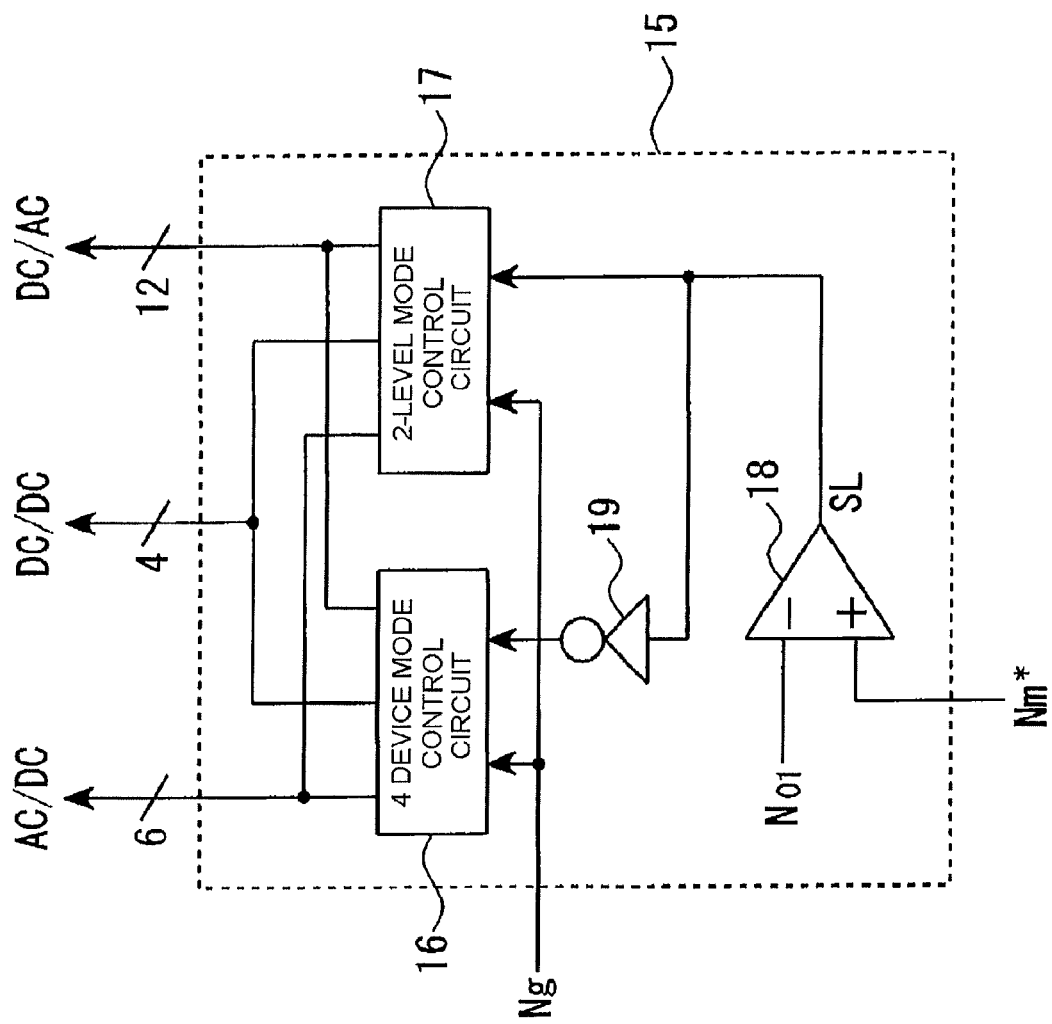
FIG. 12 is a block diagram showing a control unit using the four switching device operation control mode for a low speed region and using the two-level operation control mode for a high speed region in the first embodiment.

In this way, when the operation control mode of the DC to AC converter section 10 is changed according to the speed of the motor, for using the four switching device operation control mode for a low speed region and using the two-level operation control mode for a high speed region, the configuration of the control unit 15 in the control system 14 is provided as is given in FIG. 12.

Namely, in the control unit 15, a four device mode control circuit 16 and a two-level mode control circuit 17 are provided for the operations in the four switching device operation control mode and in the two-level operation control mode, respectively. To the control circuits 16 and 17, a rotating speed detection value Ng of the AC generator 3 is supplied and, along with this, a rotating speed instruction (or frequency instruction) value Nm* of the AC motor 12 is supplied to one of the input sides of a comparator 18 and, to the other input side of the comparator 18, a threshold value $N_{O1}$ for making decision of a low speed or a high speed is inputted. Therefore, at the comparator 18, when the rotating speed instruction (or frequency instruction) value Nm* is less than the threshold value $N_{O1}$ (Nm*<$N_{O1}$), a selection signal SL with a logical value "0" is outputted and, when the rotating speed instruction (or frequency instruction) value Nm* is equal to or more than the threshold value $N_{O1}$ (Nm*≧$N_{O1}$), a selection signal SL with a logical value "1" is outputted. The selection signal SL outputted from the comparator 18 is supplied to the four device mode control circuit 16 through a logical inverter circuit 19. While, to the two-level mode control circuit 17, the selection signal SL is directly supplied.

Both of the four device mode control circuit 16 and the two-level mode control circuit 17, when each of selection signals SL inputted thereto has a logical value "1", are brought into operation states to output switching signals (PWM signals) necessary for control to the AC to DC converter section 4, the DC to DC converter section 6 and the DC to AC converter section 10.

Therefore, when the rotating speed instruction (or frequency instruction) value Nm* to the AC motor 12 is less than the threshold value $N_{O1}$, the selection signal SL outputted from the comparator 18 becomes a signal with a logical value "0", which is subjected to logical inversion in the logical inverter circuit 19 to become a signal with a logical value "1" to be supplied to the four device mode control circuit 16. This brings the four device mode control circuit 16 into an operating state to control the switching devices and the bilateral switching circuits in the AC to DC converter section 4, the DC to DC converter section 6 and the DC to AC converter section 10. Thus, the DC to AC converter section 10 is operated in the four switching device operation control mode to drive the AC motor 12 at a low speed. At this time, the two-level mode control circuit 17, being directly supplied with the selection signal SL of the logical value "0", keeps a nonoperational state.

In a low speed driving state of the AC motor 12, with an inputted rotating speed instruction value Nm* made equal to or more than the threshold value $N_{O1}$, a selection signal SL outputted from the comparator 18 comes to have a logical value "1", by which the four device mode control circuit 16 is brought into a nonoperational state and the two-level mode control circuit 17 is brought into an operating state to drive the AC motor 12 at a high speed.

Figure 13:
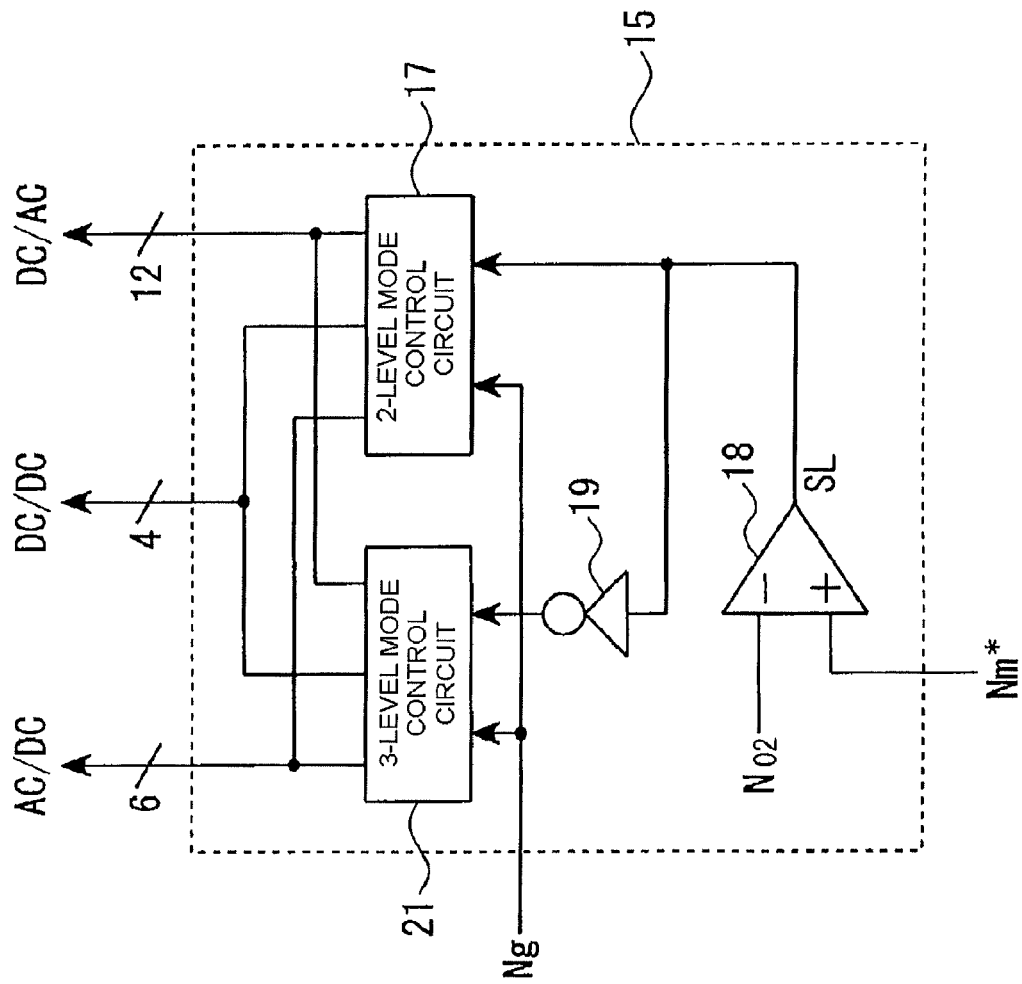
FIG. 13 is a block diagram showing a control unit using the three-level operation control mode for a low speed region and using the two-level operation control mode for a high speed region in the first embodiment.

Moreover, in the case of using the three-level operation control mode for a low speed region and using the two-level operation control mode for a high speed region, a control unit 15 with a circuit configuration as shown in FIG. 13 is used. The control unit 15 has the same configuration as that shown in FIG. 12, except that the four device mode control circuit 16 is substituted by a three-level mode control circuit 21 and a threshold value inputted to the comparator 18 is changed from $N_{O1}$ to $N_{O2}$. Thus, the parts corresponding to those shown in FIG. 12 are denoted by the same reference numerals and signs with detailed explanations thereof being omitted.

According to the circuit configuration shown in FIG. 13, when the rotating speed instruction (or frequency instruction) value Nm* is less than the threshold value $N_{O2}$, a selection signal SL with a logical value "0" is outputted from the comparator 18. The selection signal SL is subjected to logical inversion in the logical inverter circuit 19 to be supplied as a signal with a logical value "1" to the three-level mode control circuit 21. This brings the three-level mode control circuit 21 into an operation state to carry out on-off control of the switching devices Q21a to Q23b and the bilateral switching circuits SWu to SWw in the DC to AC converter section 10 in the three-level operation control mode, which drives the AC motor to rotate at a low speed.

While, when the rotating speed instruction value Nm* is equal to or more than the threshold value $N_{O2}$, a selection signal SL outputted from the comparator 18 comes to have a logical value "1", by which the two-level mode control circuit 17 is brought into an operating state to drive the AC motor 12 to rotate at a high speed.

Figure 14:
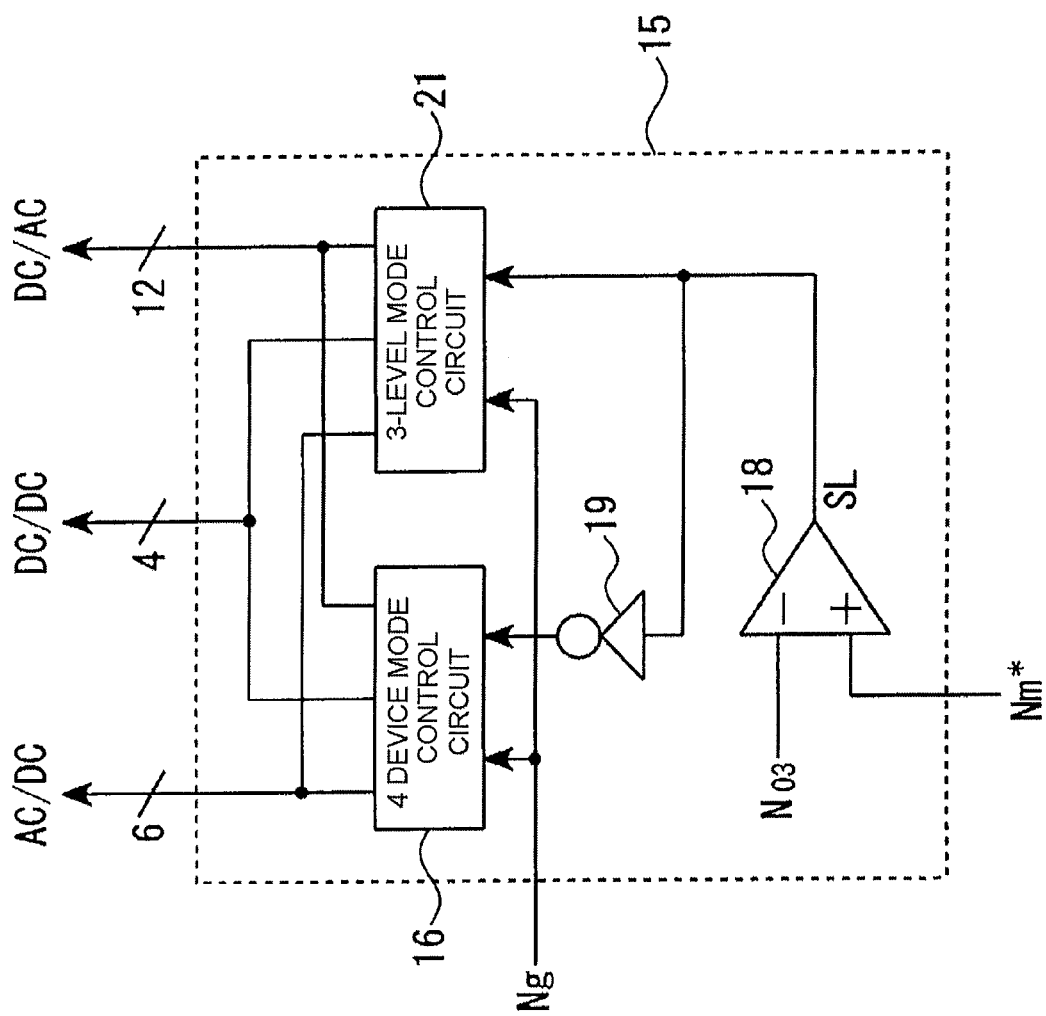
FIG. 14 is a block diagram showing a control unit using the four switching device operation control mode for a low speed region and using the three-level operation control mode for a high speed region in the first embodiment.

Furthermore, in the case of using the four switching device operation control mode for a low speed region and using the three-level operation control mode for a high speed region, a control unit 15 with a circuit configuration as shown in FIG. 14 is used. The control unit 15, except that the two-level mode control circuit 17 is omitted and the three-level mode control circuit 21 is applied instead, and a threshold value inputted to the comparator 18 is changed from $N_{O2}$ to $N_{O3}$, has the same configuration as that shown in FIG. 12. Thus, the parts corresponding to those shown in FIG. 12 are denoted by the same reference numerals and signs with detailed explanations thereof being omitted.

According to the circuit configuration shown in FIG. 14, in state where the rotating speed instruction (or frequency instruction) value Nm* is less than the threshold value $N_{O3}$, a selection signal SL outputted from the comparator 18 becomes a signal with a logical value "0", by which the four device mode control circuit 16 is brought into an operation state to operate the DC to AC converter section 10 in the four switching device operation control mode, which drives the AC motor to rotate at a low speed.

While, in state where the rotating speed instruction (or frequency instruction) value Nm* is equal to or more than the threshold value $N_{O3}$, a selection signal SL outputted from the comparator 18 becomes a signal with a logical value "1", by which the three-level mode control circuit 21 is brought into an operating state to operate the DC to AC converter section 10 in the three-level operation control mode, which drives the AC motor 12 to rotate at a high speed.

Figure 15:
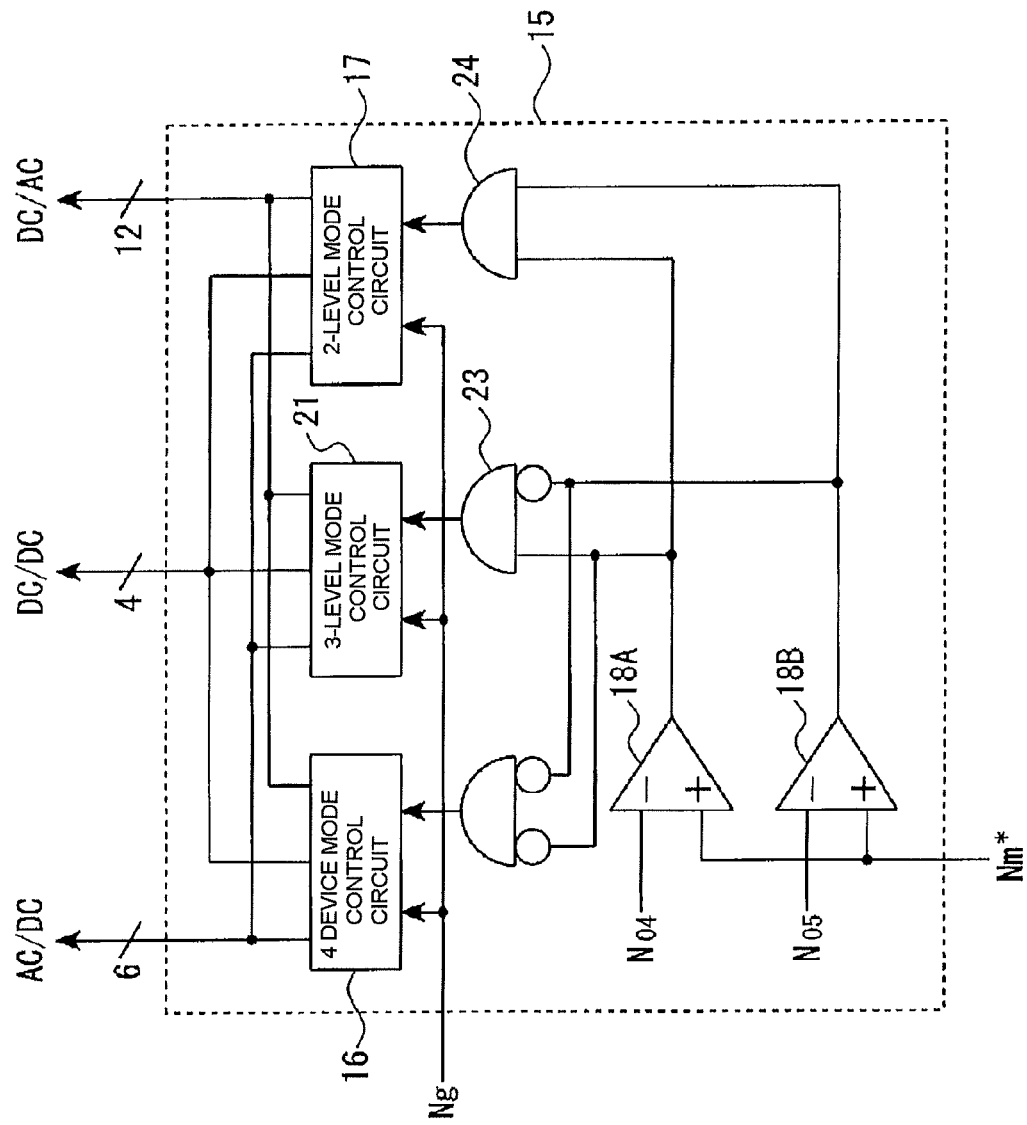
FIG. 15 is a block diagram showing the control unit using the four switching device operation control mode for a low speed region, using the three-level operation control mode for an intermediate speed region and using the two-level operation control mode for a high speed region in the first embodiment.

Still further, in the case of using the four switching device operation control mode for a low speed region, using the three-level operation control mode for an intermediate speed region and using the two-level operation control mode for a high speed region, the configuration of the control unit 15 in the control system 14 is provided as is shown in FIG. 15.

Namely, in the control unit 15 shown in FIG. 15, two sets of comparators 18A and 18B are used. To the non-inverting input side of each of the comparators 18A and 18B, a rotating speed instruction (or frequency instruction) value Nm* is inputted. To the inverting input side of the comparator 18A, a threshold value $N_{04}$ is inputted for making decision on whether the instruction value Nm* is that for a low speed or that for an intermediate speed. To the inverting input side of the comparator 18B, a threshold value $N_{05}$ is inputted for making decision on whether the instruction value Nm* is that for an intermediate speed or that for a high speed.

A selection signal SLa outputted from the comparator 18A and a selection signal SLb outputted from the comparator 18B are inputted to a NAND circuit 22, the NAND output of which is inputted to the four device mode control circuit 16. Moreover, the selection signals SLa and SLb are supplied to an AND circuit 23 with the selection signal SLb made as an inverted input and the AND output of the AND circuit is inputted to the three-level mode control circuit 21. Furthermore, the selection signals SLa and SLb are inputted to the two-level mode control circuit 17.

According to the circuit configuration shown in FIG. 15, when the rotating speed instruction (or frequency instruction) value Nm* is less than the threshold value $N_{04}$, both of the selection signals SLa and SLb outputted from the comparators 18A and 18B, respectively, become signals with logical values "0". Hence, only from the NAND circuit 22, an output with a logical value "1" is obtained as a NAND output, which is supplied to the four device mode control circuit 16 to thereby operate the DC to AC converter section 10 with the four switching device operation control mode to make the AC motor 12 driven to rotate at a low speed.

When the rotating speed instruction (or frequency instruction) value Nm* is equal to or more than the threshold value $N_{04}$ and less than the threshold value $N_{05}$, a selection signal SLa outputted from the comparator 18A becomes a signal with a logical value "1" and a selection signal SLb outputted from the comparator 18B keeps the logical value "0". Thus, only from the AND circuit 23, an output with a logical value "1" is obtained as an AND output. The AND output is supplied to the three-level mode control circuit 21, by which the three-level mode control circuit 21 is brought into an operation state to operate the DC to AC converter section 10 in the three-level operation control mode, which drives the AC motor 12 to rotate at an intermediate speed.

Furthermore, when the rotating speed instruction (or frequency instruction) value Nm* is equal to or more than the threshold value $N_{05}$, both of the selection signals SLa and SLb outputted from the comparators 18A and 18B, respectively, become signals with logical values "1". Hence, only from the AND circuit 24, an output with a logical value "1" is obtained as an AND output. The AND output is supplied to the two-level mode control circuit 17 to thereby bring the two-level mode control circuit 17 into an operation state to operate the DC to AC converter section 10 in the two-level operation control mode, which drives the AC motor 12 to rotate at an intermediate speed.

In this way, with at least two of the control circuits 16, 17 and 21 made incorporated in the control unit 15 in the control system 14 so that each carries out control in a desired operation control mode in a specified rotating speed region of the AC motor 12, a control circuit with an operation control mode suited for a given rotating speed instruction (or frequency instruction) value Nm* is chosen. This allows an operation control mode of the DC to AC converter section 10 to be chosen according to the rotating speed region of the AC motor 12 as presented in Table 1 below, according to which the AC motor 12 is driven to rotate. Therefore, an optimum operation control mode can be chosen according to the driving speed of the AC motor 12.

TABLE 1

| Motor Rotating Speed | Low Speed | High Speed | |
|---|---|---|---|
| | Low Speed | Intermediate Speed | High Speed |
| Operation Control Mode | Four Device | Three Level | Two Level |
| | Four Device | Three Level | |
| | | Three Level | Two Level |
| | Four Device | | Two Level |

In addition, in the first embodiment, by detecting values of currents flowing at the AC output points Pu to Pw and comparing the values of the detected currents with their respective normal values in switching arms under controlled states, switching arm abnormality detection can be carried out about whether the abnormality such as conduction failure has occurred or not in at least one of the switching devices of Qja to Qjb in any one of the switching arms SA21 to SA23 forming the DC to AC converter section 10. When an abnormality of a switching arm is detected by the switching arm abnormality detection, control is carried out so that a bilateral switching circuit SWj, inserted between the AC output point Pk (k=u, v or W) in the switching arm SAj, in which an abnormality is detected, and the intermediate potential point Pd of the DC circuit 8, is brought into a closed state and the rest two bilateral switching circuits are brought into opened states. This can operate the DC to AC converter circuit section 10 in the previously explained four switching device operation control mode to enable the AC motor 12 to be driven to rotate at a low speed.

Figure 16:
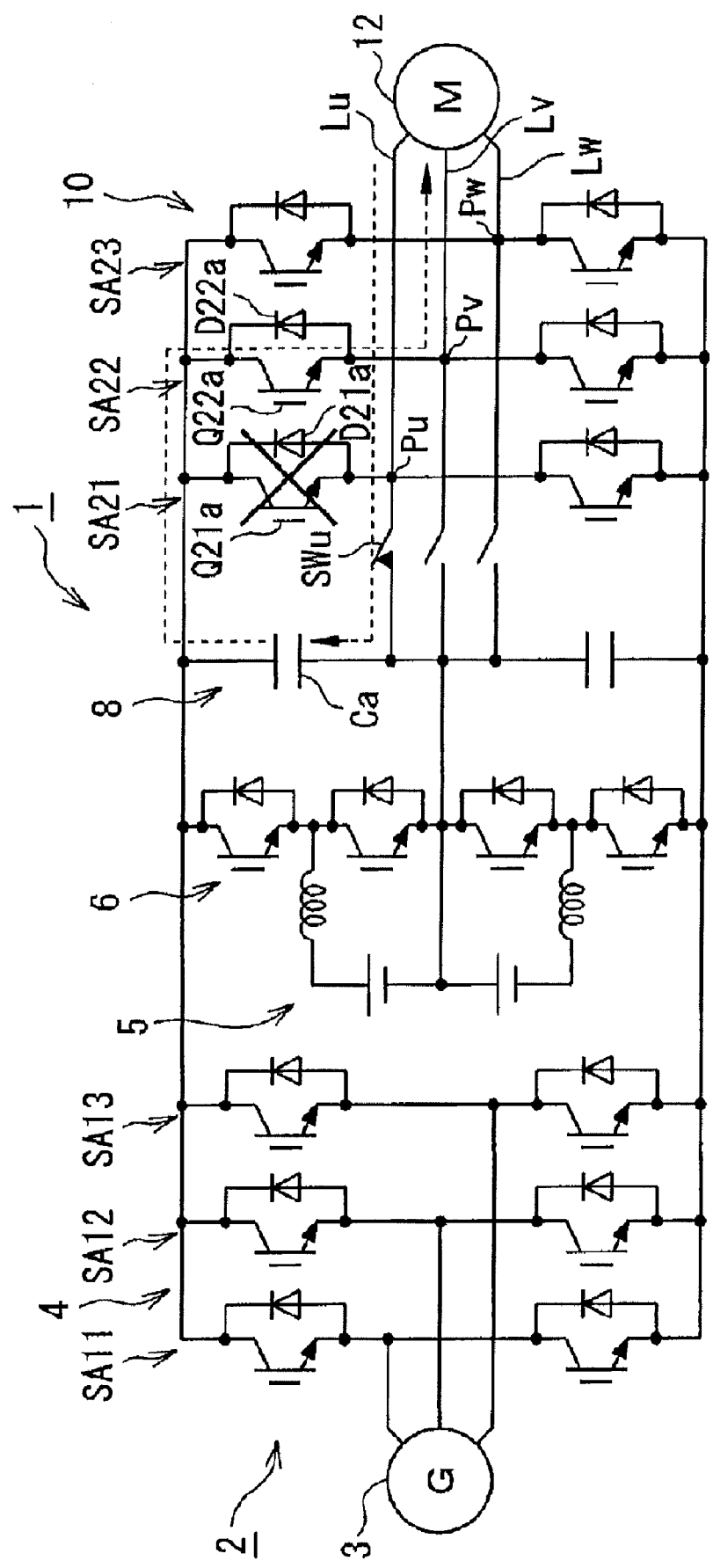
FIG. 16 is a diagram illustrating an operation in an abnormal state of a switching arm in the DC to AC converter section in the first embodiment.

Namely, as shown in FIG. 16, a diagram illustrating an operation in an abnormal state of a switching arm in the DC to AC converter section in the first embodiment, when a conduction failure occurs in a switching device in any one of the switching arms SA21 to SA23, the switching device Q21A in the switching arm SA21, for example, the bilateral switching circuit SWu, inserted between the AC output point Pu of the switching arm SA21 and the intermediate potential point Pd in the DC circuit 8, is brought into a closed state and the rest two bilateral switching circuits SWv and SWw are kept in opened states. This allows the DC to AC converter section 10 to carry out the operation in the four switching device operation control mode explained with reference to FIG. 5A to FIG. 6C shown before. Therefore, the low speed rotational driving of the AC motor 12 can be kept continuously to make it possible to continue the state of driving the AC motor 12.

In addition, a regenerated current generated in the AC motor 12 at braking of a hybrid electric vehicle is supplied from the DC to AC converter section 10 to the battery 5 as a charging current with the voltage in the DC to AC converter section 10 decreased in the DC to DC converter section 6.

Figure 17:
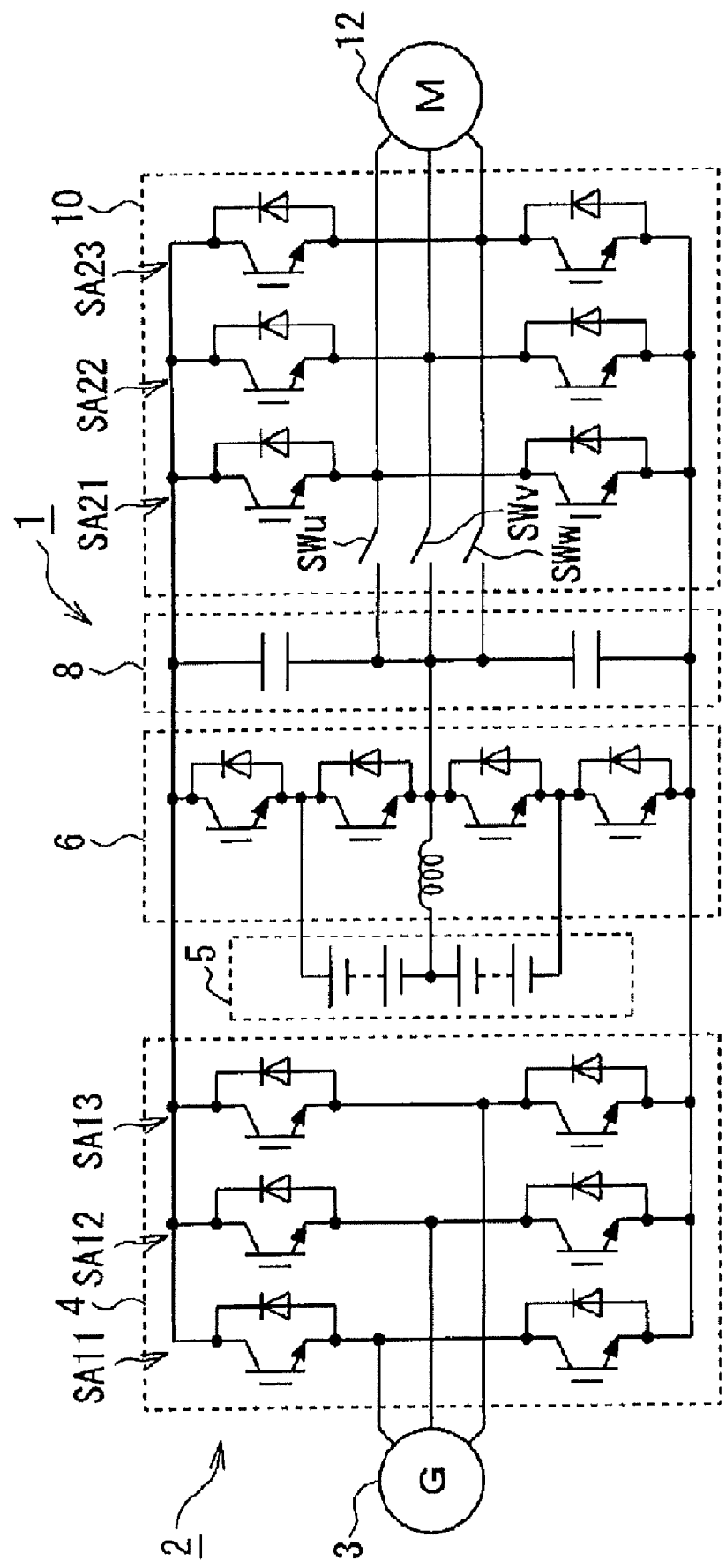
FIG. 17 is a block diagram showing an example of a modification of the first embodiment of the invention.

In the first embodiment, an explanation was made about the case in which the positive electrode side of the battery 5 is connected to the point between the switching devices Q6a and Q6b forming the DC to DC converter section 6 through the step-up reactor 7a and the negative electrode side of the battery 5 is connected to the point between the switching devices Q6c and Q6d through the step-up reactor 7b. The configuration of the electric power converter according to the invention, however, is not limited to this but can be provided to have a configuration as is given in FIG. 17, a block diagram showing an example of a modification of the first embodiment of the invention. In the configuration, the positive electrode side of the battery 5 is directly connected to the point between the switching devices Q6a and Q6b forming the DC to DC converter section 6, the negative electrode side of the battery 5 is directly connected to the point between the switching devices Q6c and Q6d and a step-up reactor 7 is inserted between the point between the switching devices Q6b and Q6c and an intermediate potential point Pb in the battery 5. In this case, it is impossible to carry out different kinds of step-up control on the positive electrode side and the negative electrode side of the battery 5, but the step-up reactor 7 can be used in common to the circuits on both of the positive electrode side and the negative electrode side, which offers the advantage of providing the converter at a lower cost compared with that of the converter with the configuration shown in FIG. 1.

Figure 18:
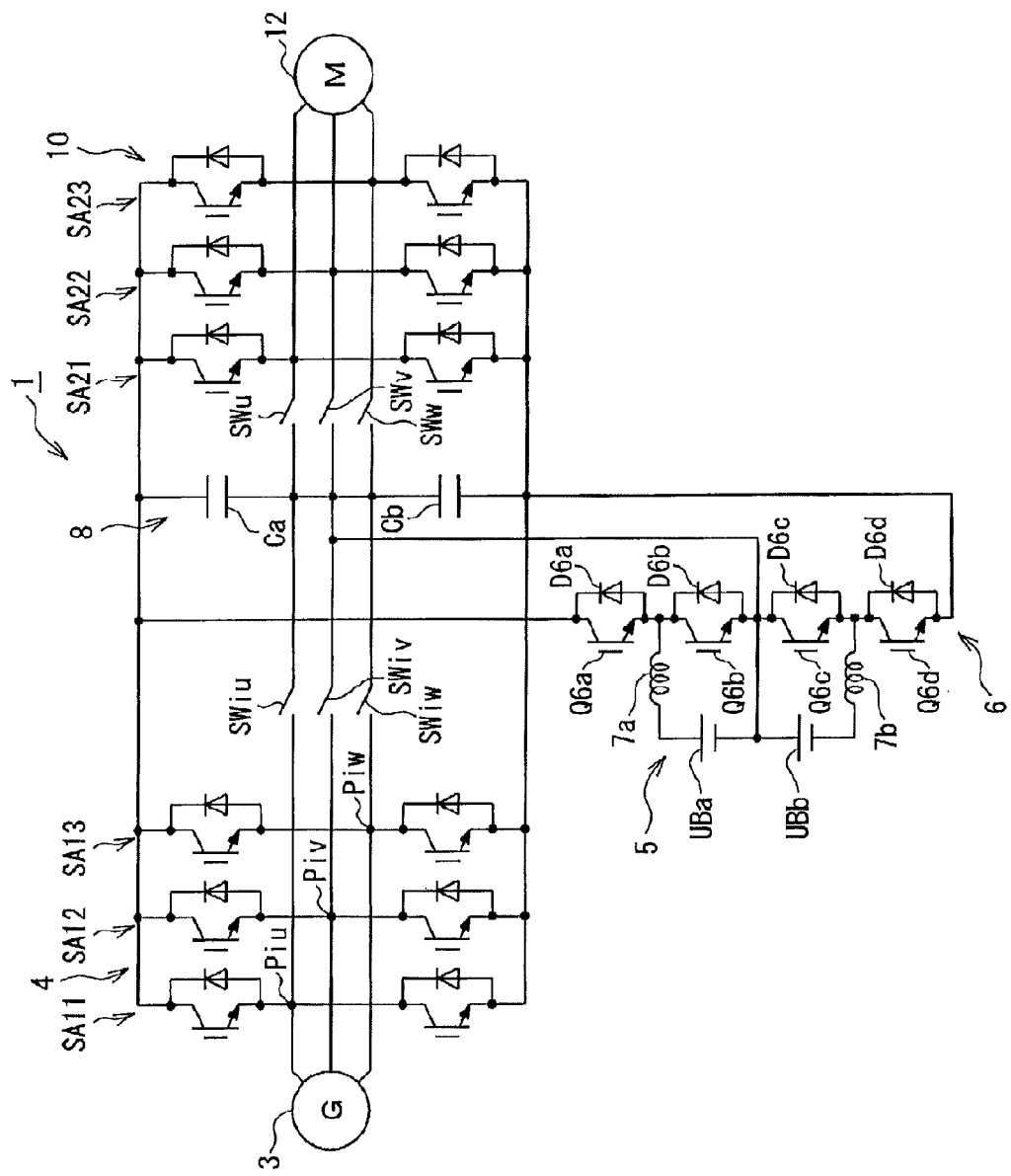
FIG. 18 is a block diagram showing an example of another modification of the first embodiment of the invention.

Moreover, in the first embodiment, an explanation was made about the case in which, between the intermediate potential point Pd in the DC circuit 8 and the AC output points Pu to Pw in the DC to AC converter section 10, the bilateral switching circuits SWu to SWw are inserted, respectively. The invention, however, is not limited to this but, as given in FIG. 18, a block diagram showing an example of another modification of the first embodiment of the invention, by inserting bilateral switching circuits SWiu to SWiw similar to the bilateral switching circuits SWu to SWw between AC input points Piu to Piw, respectively, in the AC to DC converter section 4 in the DC power supply section 2 and the intermediate potential point Pd, a circuit configuration for a three-level operation control mode can be also provided with respect to the AC to DC converter section 4.

In the next, a second embodiment according to the invention will be explained with reference to FIG. 19 to FIG. 23.

Figure 19:
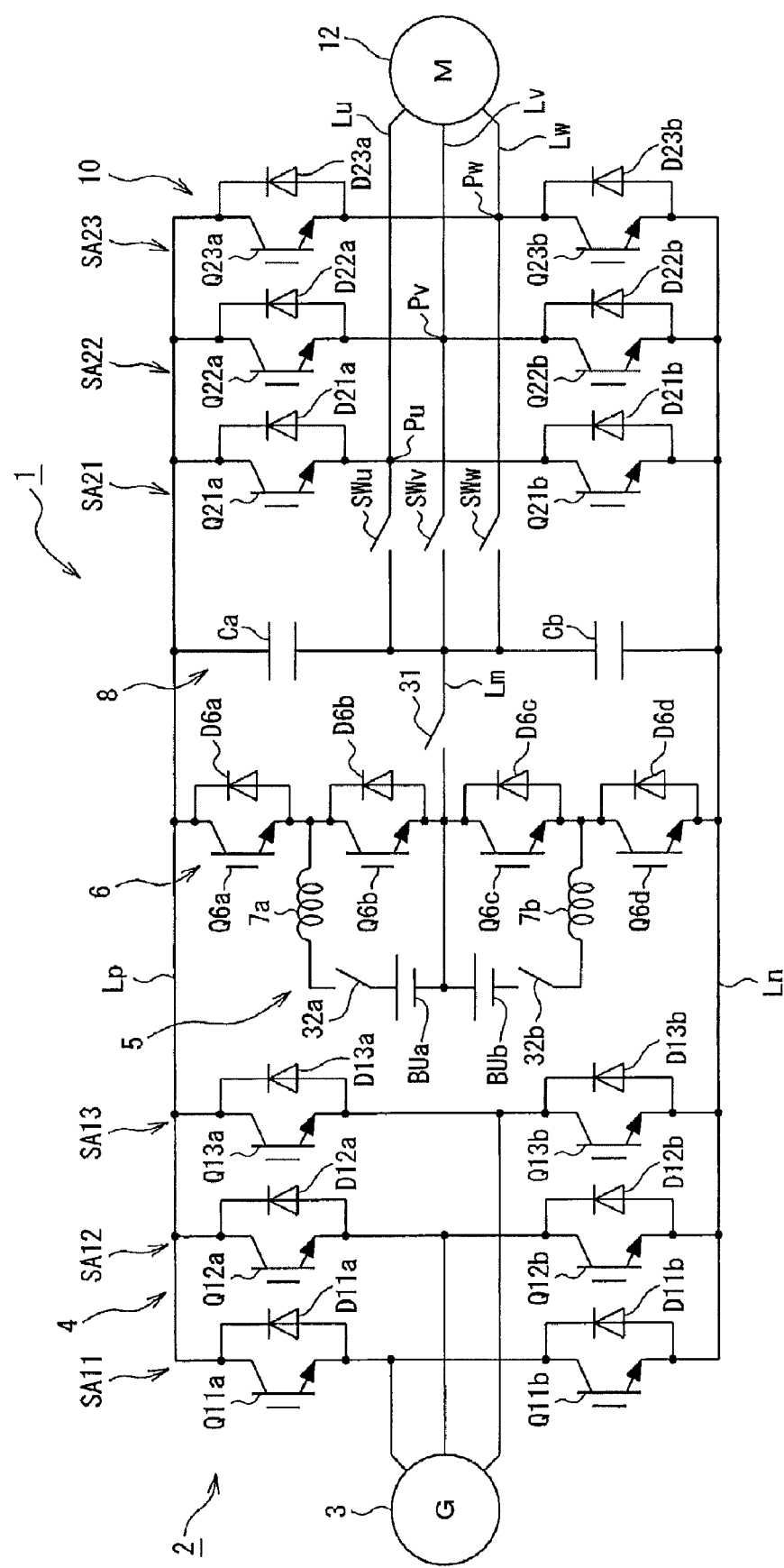
FIG. 19 is a block diagram showing a circuit configuration of a second embodiment of an electric power converter according to the invention.
Figure 20:
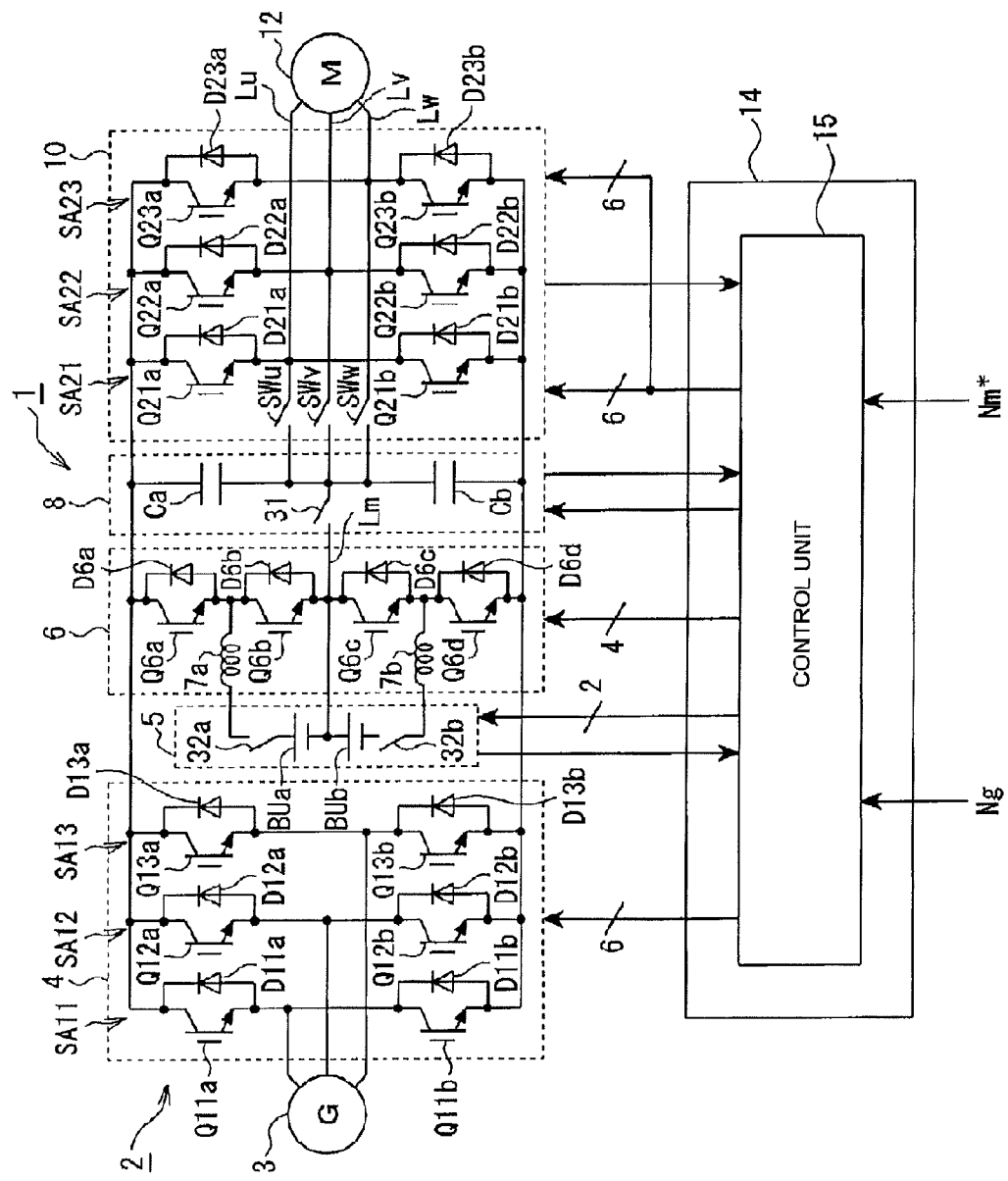
FIG. 20 is a block diagram showing the second embodiment of the electric power converter according to the invention with a control unit included.
Figure 21:
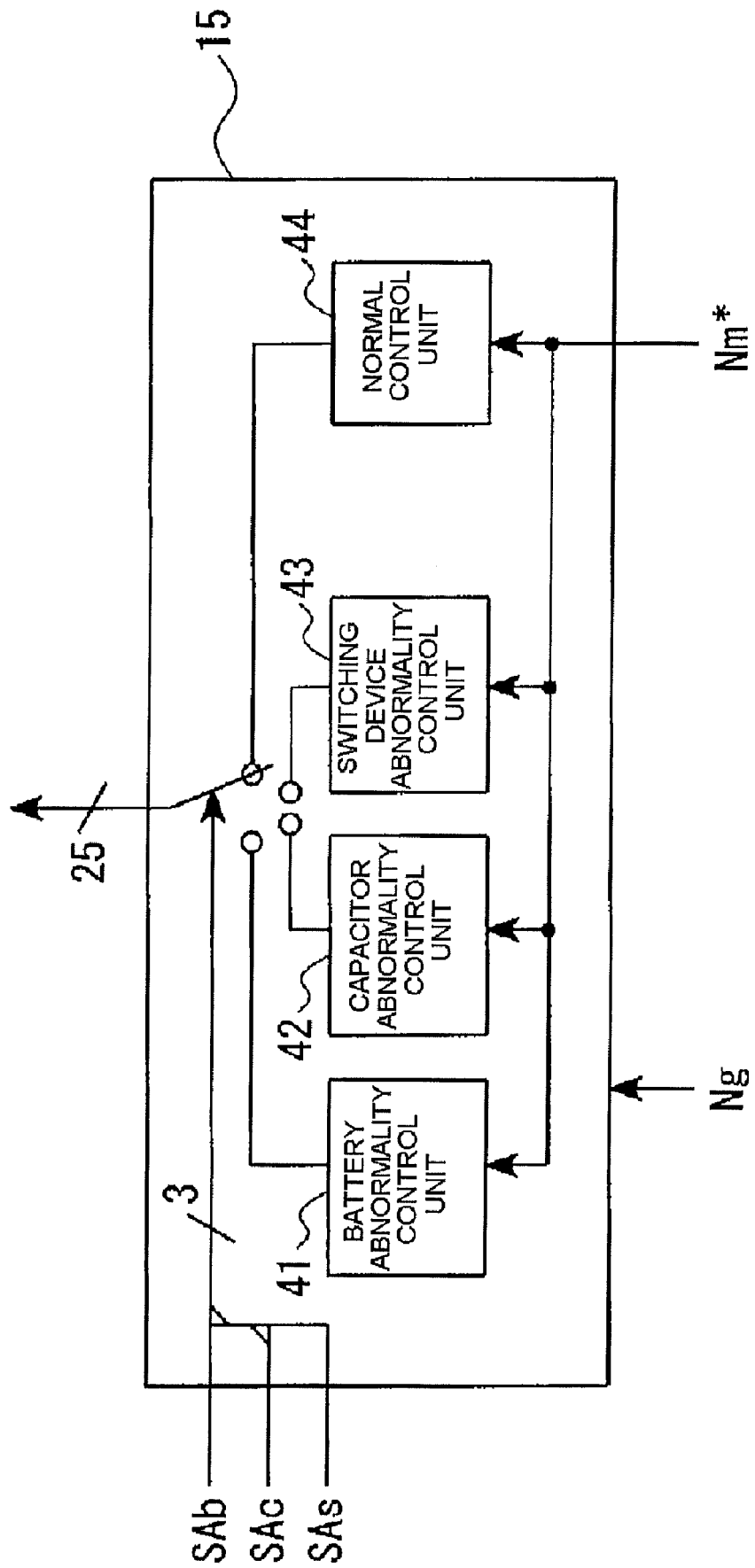
FIG. 21 is a block diagram showing a specific configuration of the control unit shown in FIG. 20.
Figure 22A:
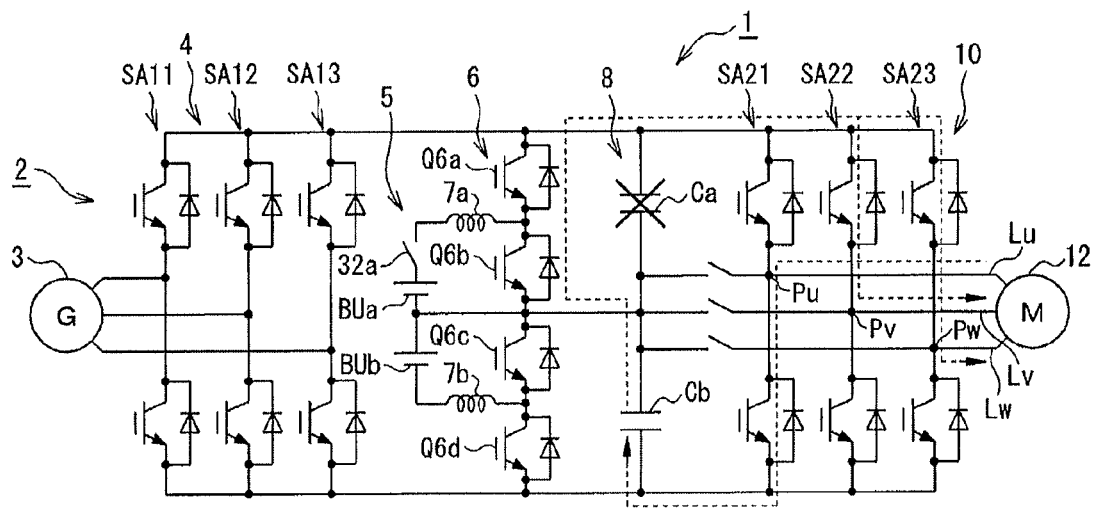
FIG. 22A, 22B and 22C are diagrams illustrating an operation in an abnormal state of a DC link capacitor in the DC circuit in the second embodiment.
Figure 22B:
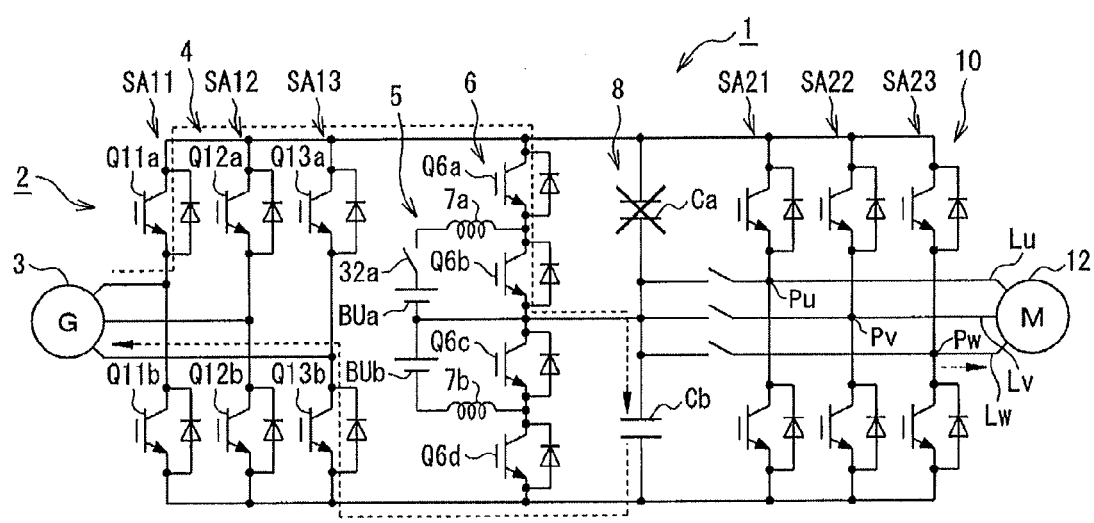
Figure 22C:
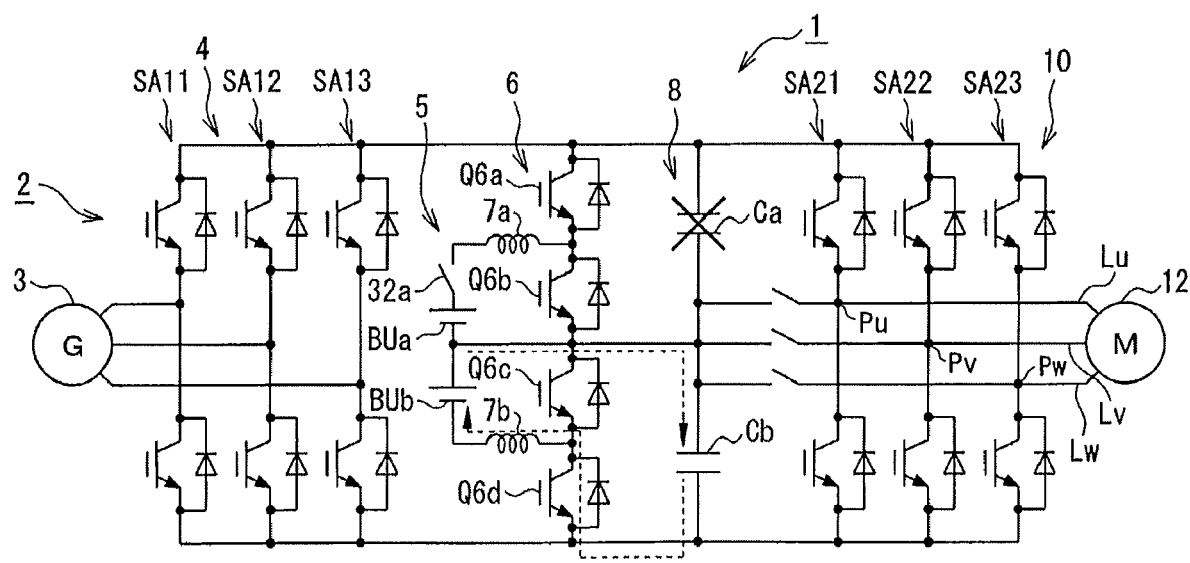
Figure 23A:
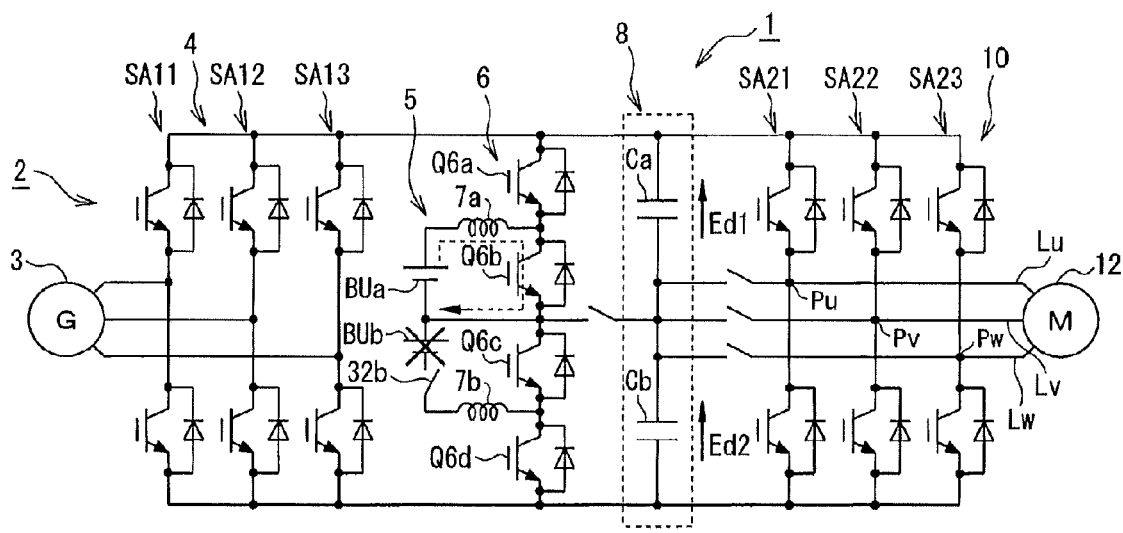
FIG. 23A and 23B are diagrams illustrating an operation in an abnormal state of a battery unit in the second embodiment.
Figure 23B:
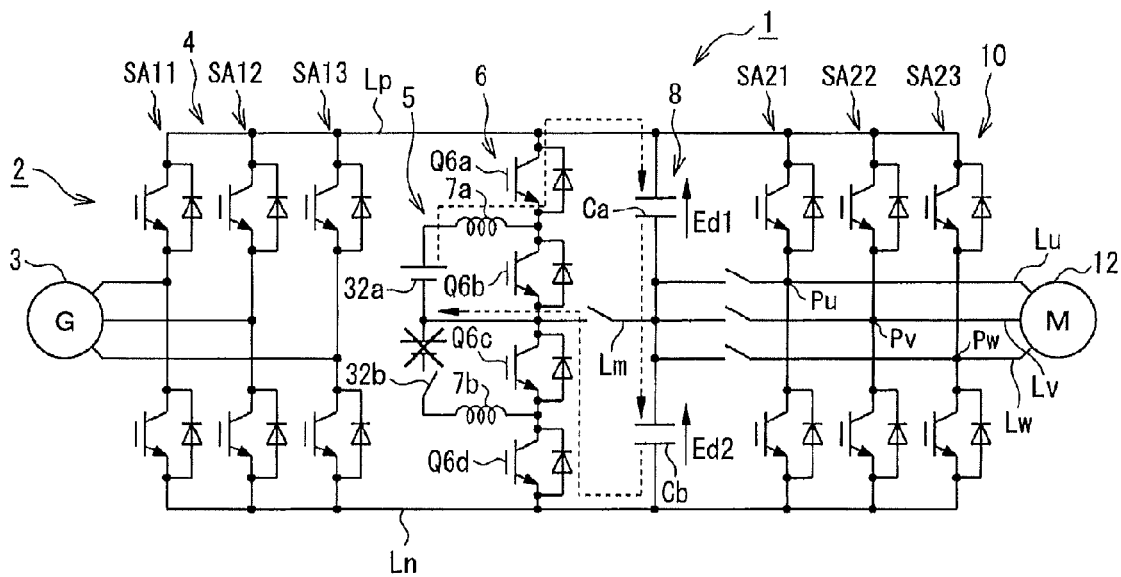

FIG. 19 is a block diagram showing a circuit configuration of a second embodiment of the electric power converter according to the invention, FIG. 20 is a block diagram showing the second embodiment of the electric power converter according to the invention with a control unit included, FIG. 21 is a block diagram showing a specific configuration of the control unit shown in FIG. 20, FIG. 22A, 22B and 22C are diagrams illustrating an operation in an abnormal state of a DC link capacitor in the DC circuit in the second embodiment and FIG. 23 is a diagram FIG. 23A and 23B are diagrams illustrating an operation in an abnormal state of a battery unit in the second embodiment.

In the second embodiment, even in the case when an abnormality occurs in the battery unit BUa or BUb in the battery 5 or in the case when an abnormality occurs in one of the DC link capacitors Ca and Cb in the DC circuit 8, the AC motor 12 is made drivable.

Namely, the second embodiment, as is shown in FIG. 19, has the same configuration as that of the first embodiment shown in FIG. 1 except that a bilateral switching circuit 31, formed similarly to the bilateral switching circuits SWu to SWw, is inserted in the section to become the short circuit between the DC to DC converter section 6 and the DC circuit 8 in the intermediate potential line Lm in the first embodiment, and that bilateral switching circuits 32a and 32b are inserted in a section between the battery unit BUa and the step-up reactor 7a and in a section between the battery unit BUb and the step-up reactor 7b, respectively. Thus, the parts corresponding to those shown in FIG. 1 are denoted by the same reference numerals and signs with detailed explanations thereof being omitted.

The on-off control of the bilateral switching circuits 31, 32a and 32b is carried out by the control unit 15 in the control system 14 shown in FIG. 20. Here, the specific configuration of the control unit 15 is shown in FIG. 21. As shown in FIG. 21, the control unit 15 has a control unit at battery abnormality 41, a control unit at capacitor abnormality 42, a control unit at switching device abnormality 43 and a control unit at normal 44.

The control unit at battery abnormality 41 controls the AC to DC converter section 4, the bilateral switching circuits 32a and 32b in the battery 5, the DC to DC converter section 6 and the DC to AC converter section 10 when an abnormality is detected in the battery unit BUa or BUb in the battery 5. The control unit at capacitor abnormality 42 controls the AC to DC converter section 4, the bilateral switching circuits 32a and 32b in the battery 5, the DC to DC converter section 6 and the DC to AC converter section 10 when an abnormality is detected in the DC link capacitor Ca or Cb in the DC circuit 8. The control unit at switching device abnormality 43 controls the AC to DC converter section 4, the bilateral switching circuits 32a and 32b in the battery 5, the DC to DC converter section 6 and the DC to AC converter section 10 when an abnormality is detected in any one of the switching devices. The control unit at normal 44 controls the AC to DC converter section 4, the bilateral switching circuits 32a and 32b in the battery 5, the DC to DC converter section 6 and the DC to AC converter section 10 when every section is normal.

When a capacitor abnormality detection signal SAc is inputted as a result of detection of an abnormality of either one of the DC link capacitors Ca or Cb in the DC circuit 8, the DC link capacitor Ca, for example, the bilateral switching circuits SWu to SWw in the DC to AC converter section 10 are first brought into a normally turned-off state by the control unit at capacitor abnormality 42 as shown in FIG. 22A. Along with this, with respect to the battery unit BUb in the battery 5, provided on the negative electrode side opposite to the positive electrode side on which the DC link capacitor Ca is provided, the bilateral switching circuit 32b is kept to be in a closed state. While, with respect to the battery unit BUa in the battery 5, provided on the same side as the positive electrode side on which the DC link capacitor Ca is provided, the bilateral switching circuit 32a is made opened.

In this state, the switching devices Q6a and Q6b in the DC to DC converter section 6 are brought into a turned-on state and, along with this, the switching devices Q22a, Q23a and Q21b in the DC to AC converter section 10 are also brought into a turned-on state. With this, a path of a discharged current is formed from the intermediate potential side of the normal DC link capacitor Cb in the DC circuit 8 to the windings Lv and Lw through the switching devices Q6b and Q6a in the DC to DC converter section 6 and the switching devices Q22a and Q23a in the DC to AC converter section 10, and from the winding Lu to the negative electrode side of the DC link capacitor Cb through the AC output point Pu and the switching device Q21b.

While, for a charging circuit of the DC link capacitor Cb in the DC circuit 8, as shown in FIG. 22B, a path of a charging current is formed in which an AC current outputted from the winding Lu of the AC generator 3 flows to the intermediate potential side of the DC link capacitor Cb through the switching device Q11a and the switching devices Q6a and Q6b in the DC to DC converter section 6.

Furthermore, for a charging circuit of the DC link capacitor Cb by the battery 5, as shown in FIG. 22C, by bringing the switching device Q6d in the DC to DC converter section 6 into a turned-on state, a path of a charging current is formed from the positive electrode side of the battery unit BUb to the negative electrode side of the battery unit BUb through the intermediate potential line Lm, the DC link capacitor Cb in the DC circuit 8, the switching device Q6d and the step-up reactor 7b in the DC to DC converter section 6.

Moreover, when a battery abnormality detection signal SAb, informing detection of occurrence of an abnormality in the battery unit BUb, is inputted, the bilateral switching circuit 32b connected to the battery unit BUb having become abnormal is opened and, along with this, the bilateral switching circuit 31 inserted in the intermediate potential line Lm is brought into an opened state.

In this state, as shown in FIG. 23A, with the switching device Q6b in the DC to DC converter section 6 brought into a turned-on state, a current path is formed from the positive electrode side of the battery unit BUa to the intermediate potential side of the battery unit BUa through the step-up reactor 7a and the switching device Q6b, which results in an energy storing state. Thereafter, the switching device Q6b is brought into a turned-off state and the switching devices Q6a, Q6c and Q6d in the DC to DC converter section 6 are brought into a turned-on state. Then, a voltage due to the energy stored in the step-up reactor 7a is added to the output voltage of the battery unit BUa to be applied to the DC link capacitors Ca and Cb in the DC circuit 8 to charge them and the charging current returns to the negative electrode side of the battery unit BUa through the switching devices Q6d and Q6c.

Therefore, even in the case in which the battery unit BUb is brought into an abnormal condition, the DC link capacitors Ca and Cb in the DC circuit 8 can be charged by the assistance of the normal battery unit BUa.

Furthermore, like in the foregoing cases of detecting occurrences of abnormalities in the DC link capacitor Ca and the battery unit BUb, when a switching device abnormality detection signal SAs, informing that occurrence of an abnormality in a switching device in the DC to AC converter section 10 is detected, is inputted, the control unit at switching device abnormality 43 is chosen. By the control unit at switching device abnormality 43, as shown in FIG. 16, the bilateral switching circuit SWu, connected to the AC output point Pu to which the switching device Q21a having become abnormal is connected, is brought into a closed state, by which driving of the AC motor 12 can be continued in the four switching device operation control mode.

In this way, according to the second embodiment, the bilateral switching circuit 31 is inserted in the section to become the short circuit between the intermediate potential point of the DC to DC converter section 6 and the intermediate potential point Pd of the DC circuit 8. Along with this, the bilateral switching circuit 32a is inserted in a section between the battery unit BUa and the step-up reactor 7a, and the bilateral switching circuit 32b is further inserted in a section between the battery unit BUb and the step-up reactor 7b. Thus, when an abnormality of either the DC link capacitor Ca or Cb forming the DC circuit 8 is detected, the charging current path and the discharging current path of the other normal capacitor are secured to ensure an electric power conversion in the DC to AC converter section 10, which enables the AC motor 12 to continue to be driven to rotate.

In the same way, also in the case when either the battery unit BUa or BUb in the battery 5 becomes abnormal, the other normal battery unit is used to make it possible to assist the charging of the DC link capacitors Ca and Cb in the DC circuit 8.

Similarly, also in the case when at least one of the switching devices in the DC to AC converter section 10 becomes abnormal, with the DC to AC converter section 10 driven to be controlled in the four switching device operation control mode to enable the AC motor 12 to be continuously driven.

The operations at occurrence of the abnormalities are summarized as shown in Table 2 below.

TABLE 2

| Failure Mode | AC/DC Circuit | DC/DC Circuit | SW Device between Battery and Capacitor | SW Device for Three-level | DC/AC Circuit |
|---|---|---|---|---|---|
| Battery Failure | Normal Operation | Only ½ circuit Operated | Opened | Opened | Two-level Operation |
| DC/AC Converter Circuit Device Failure | Normal | Normal | Short-circuited | Faulty Phase Short-circuited Other Phases Opened | Four Device Operation |
| Capacitor Failure | Normal Operation | Only ½ circuit Operated | Short-Circuited | Opened | Two-level Operation |

In the next, a third embodiment according to the invention will be explained with reference to FIG. 24.

Figure 24:
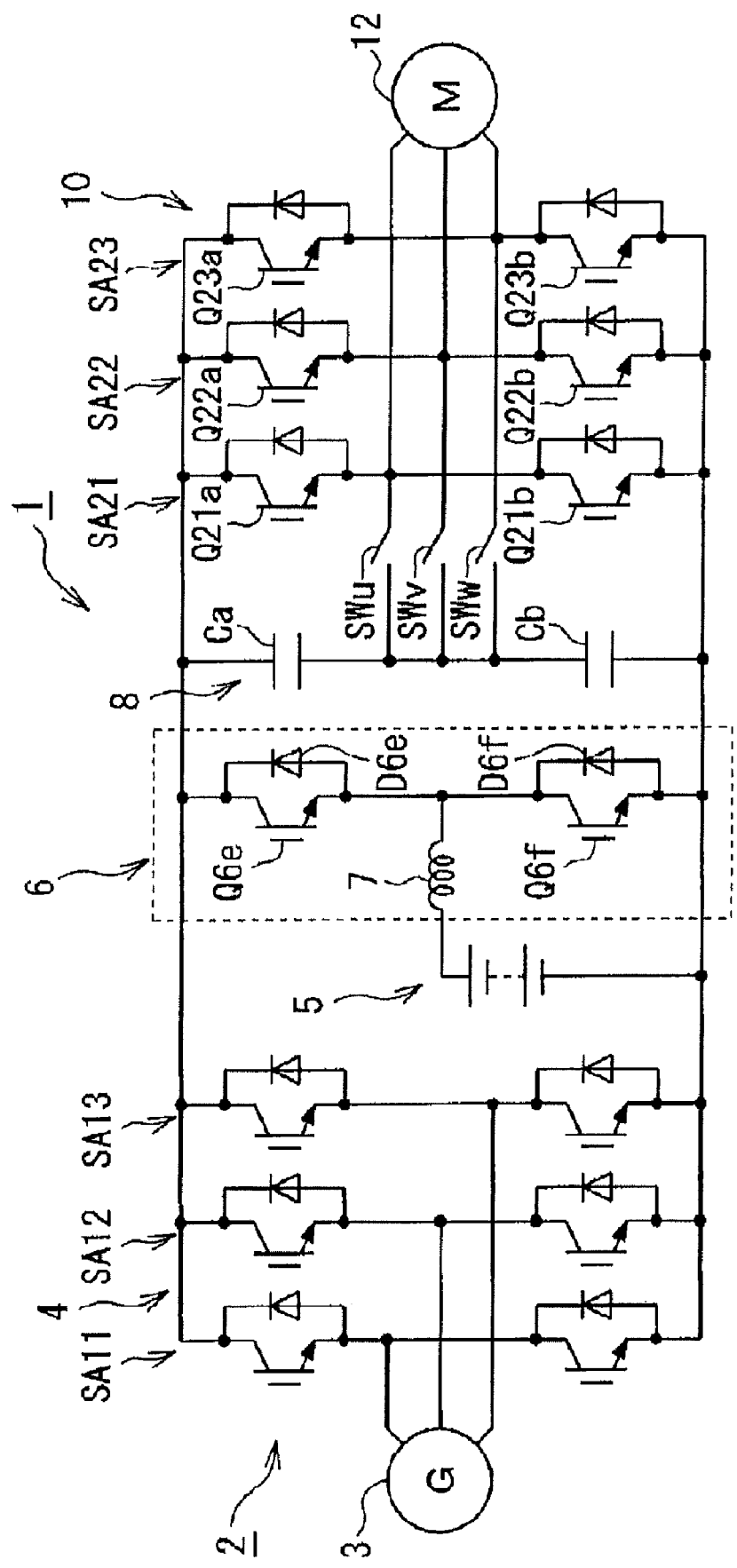
FIG. 24 is a block diagram showing a circuit configuration of a third embodiment of the electric power converter according to the invention.
Figure 25:
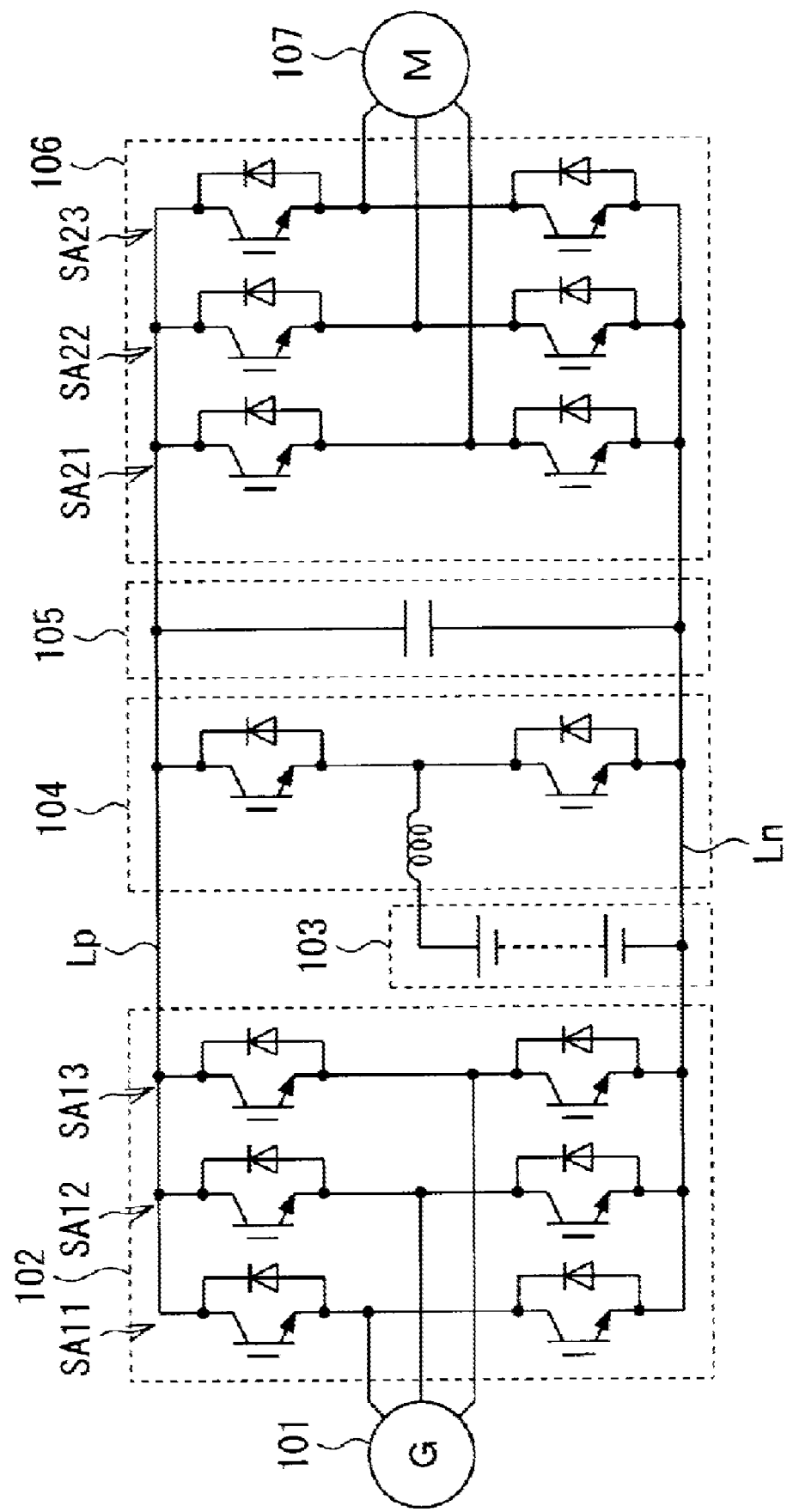
FIG. 25 is a block diagram showing a circuit configuration of a related power converter.

FIG. 24 is a block diagram showing a circuit configuration of a third embodiment of the electric power converter according to the invention.

The third embodiment has the same configuration as that of the first embodiment shown in FIG. 1 explained before except that the voltage step-up section in each of the first and second embodiments is simplified so that the positive electrode side of the battery 5 is connected through a step-up reactor 7 to the connection point of switching devices Q6e and Q6f connected in series between the positive electrode side line Lp and the negative electrode side line Ln. Thus, the parts corresponding to those shown in FIG. 1 and FIG. 19 are denoted by the same reference numerals and signs with detailed explanations thereof being omitted. To the switching devices Q6e and Q6f, diodes D6e and Df6 are connected, respectively, in inverse parallel to the devices.

According to the third embodiments, although an occurrence of an abnormality in the battery 5 and an occurrence of an abnormality in the DC circuit 8 can not be protected, the circuit configuration in the DC to DC converter section 6 can be simplified to enable reduction in a total manufacturing cost.

In the first to third embodiments, explanations were made about the case in which the DC power supply section 2 has the AC generator 3 and the AC electric power generated by the AC generator 3 is converted into DC electric power in the AC to DC converter section 4 to be outputted between the positive electrode side line Lp and the negative electrode side line Ln. The invention, however, is not limited to this, but an electric power generator that can directly generate DC power such as a fuel cell and a solar cell can be also applied.

Moreover, in the first to third embodiments, explanations were made about the case in which the electric power converter 1 is made to have a configuration having the DC power supply section 2 and being applicable to a hybrid electric vehicle. The invention, however, is not limited to this, but the electric power converter 1 also can be made to have a configuration applicable to an electric vehicle in which configuration the DC power supply section 2 is omitted and the voltage of the battery 5 is raised in the DC to DC converter section 6 to be supplied to the DC circuit 8. In addition, the invention can be generally applied to industrial machines using motors.

Furthermore, in the first to third embodiments, explanations were made about the case to which an IGBT was applied as the switching device. The invention, however, is not limited to this, but there can be applied switching devices such as a power MOSFET, a gate turn-off thyristor (GTO) and a static induction transistor (SIT).

Still further, in the first to third embodiments, explanations were made about the cases in each of which the AC to DC converter section 4 is formed by using semiconductor switching devices. The invention, however, is not limited to this, but a diode rectifier circuit can be applied in which the semiconductor switching devices are substituted by diodes.

While the present invention has been particularly shown and described with reference to the preferred embodiments thereof, it will be understood by those skilled in the art that the foregoing and other changes in form and details can be made therein without departing from the spirit and scope of the present invention.

What is claimed is:

1. An electric power converter comprising:
a battery with at least two battery units connected in series;
a DC to DC converter section adjusting DC electric power of the battery and having a positive electrode side line and a negative electrode side line;
a DC circuit having at least two DC link capacitors connected in series between the positive electrode side line and the negative electrode side line;
an electric power converter section connected to the DC circuit to convert DC electric power to AC electric power and supply the converted AC electric power to a motor;
a first bilateral switching device connecting a first intermediate potential point between the DC link capacitors to an AC output point in the electric power converter section; and
a short circuit formed with an intermediate potential line short-circuiting the first intermediate potential point to a second intermediate potential point between the battery units.

2. The electric power converter as claimed in claim 1, wherein a second bilateral switching device is inserted between the first and second intermediate potential points.

3. The electric power converter as claimed in claim 2 wherein, when an abnormality is detected in at least one of the battery units in the battery, the second bilateral switching device is made open and DC electric power of a normal battery unit is adjusted in the DC to DC converter section to be supplied to the DC circuit.

4. The electric power converter as claimed in claim 1, wherein
the electric power converter section is provided with a plurality of switching arms corresponding to respective phases of polyphase AC electric power and connected in parallel between the positive electrode side line and the negative electrode side line,
each switching arm has a pair of switching devices connected in series between the positive electrode side line and the negative electrode side line with a connection point thereof serving as the AC output point,
the switching devices are configured to operate to convert DC electric power to polyphase AC electric power to be supplied to the motor, such that the motor is driven in two step speed regions of a low speed regions and a high speed regions, and
an operation control mode of the switching devices and the bilateral switching devices differs between a case of driving the motor in a low speed region and a case of driving the motor in a high speed region.

5. The electric power converter as claimed in claim 4 wherein,
when driving the motor in the low speed region, the motor is driven in a four switching device operation control mode in which, in the electric power converter section, switching devices in a switching arm corresponding to an arbitrary phase of the polyphase are brought into a normally turned-off states, only the respective first bilateral switching device, connecting the intermediate potential point in the DC circuit and an AC output point in the switching arm having the switching devices being brought into the normally turned-off states, is brought into a normally turned-on state and on-off control is carried out with respect to the switching devices in switching arms other than the switching arm having the switching devices brought into the normally turned-off state and,
when driving the motor in the high speed region, the motor is driven in a two-level operation control mode in which all of the first bilateral switching devices connecting the intermediate potential point in the DC circuit and the AC output points in all of the switching arms are brought into normally turned-off states and on-off control is carried out with respect to all of the switching devices in all of the switching arms in the electric power converter section.

6. The electric power converter as claimed in claim 4 wherein,
when driving the motor in the low speed region, the motor is driven in a three-level operation control mode in which, in the electric power converter section, on-off control is carried out with respect to the switching devices in the switching arms and the respective first bilateral switching devices connecting the intermediate potential point in the DC circuit and the AC output points in the switching arms and,
when driving the motor in the high speed region, the motor is driven in a two-level operation control mode in which all of the first bilateral switching devices connecting the intermediate potential point in the DC circuit and the AC output points in all of the switching arms are brought into normally turned-off states and on-off control is carried out with respect to all of the switching devices in all of the switching arms in the electric power converter section.

7. The electric power converter as claimed in claim 4 wherein,
when driving the motor in the low speed region, the motor is driven in a four switching device operation control mode in which, in the electric power converter section, switching devices in a switching arm corresponding to an arbitrary phase of the polyphase are brought into normally turned-off states, only the first bilateral switching device, connecting the intermediate potential point in the DC circuit and an AC output point in the switching arm having the switching devices being brought into the normally turned-off states, is brought into a normally turned-on state and on-off control is carried out with respect to the switching devices in switching arms other than the switching arm having the switching devices brought into the normally turned-off state and, when driving the motor in the high speed region, the motor is driven in a three-level operation control mode in which, in the electric power converter section, on-off control is carried out with respect to the switching devices in the switching arms and the first bilateral switching devices connecting the intermediate potential point in the DC circuit and the AC output points in the switching arms.

8. The electric power converter as claimed in claim 1, wherein the electric power converter section is provided with a plurality of switching arms corresponding to respective phases of polyphase AC electric power and connected in parallel between the positive electrode side line and the negative electrode side line, each switching arm has a pair of switching devices connected in series between the positive electrode side line and the negative electrode side line with the connection point serving as the AC output point, the switching devices are configured to operate to convert DC electric power to polyphase AC electric power to be supplied to the motor, such that the motor is driven in three step speed regions of a low speed region, an intermediate speed region and a high speed region, and an operation control mode of the switching devices and the bilateral switching devices differs among a case of driving the motor in the low speed region, a case of driving the motor in the intermediate speed region and a case of driving the motor in the high speed region.

9. The electric power converter as claimed in claim 8 wherein, when driving the motor in the low speed region, the motor is driven in a four switching device operation control mode in which, in the electric power converter section, switching devices in a switching arm corresponding to an arbitrary phase of the polyphase are brought into normally turned-off states, only the first bilateral switching device, connecting the intermediate potential point in the DC circuit and an AC output point in the switching arm having the switching devices being brought into the normally turned-off states, is brought into a normally turned-on state and on-off control is carried out with respect to the switching devices in switching arms other than the switching arm having the switching devices brought into the normally turned-off state, when driving the motor in the intermediate speed region, the motor is driven in the three-level operation control mode in which, in the electric power converter section, on-off control is carried out with respect to the switching devices in the switching arms and the bilateral switching devices connecting the intermediate potential point in the DC circuit and the AC output points in the switching arms, and when driving the motor in the high speed region, the motor is driven in the two-level operation control mode in which all of the bilateral switching devices connecting the intermediate potential point in the DC circuit and the AC output points in all of the switching arms are brought into normally turned-off states and on-off control is carried out with respect to all of the switching devices in all of the switching arms in the electric power converter section.

10. The electric power converter as claimed in claim 1 wherein, when an abnormality is detected in at least one of the switching arms forming the electric power converter, the first bilateral switching device, connected between the intermediate potential point in the DC circuit and the AC output point in the switching arm with the abnormality detected therein, is brought into a normally turned-on state and on-off control is carried out with respect to switching devices in switching arms other than the switching arm with the abnormality detected therein to make the motor driven.

11. The electric power converter as claimed in claim 1 wherein, when an abnormality is detected in one of the capacitors in the DC circuit, a third bilateral switching device, forming a step-up circuit on the side with a polarity opposite to the polarity on the side of the capacitor with the abnormality detected therein, is brought into a normally turned-on state, a fourth bilateral switching device connected to a battery unit on the same polarity side is brought into an opened state, and the motor is driven in a two-level operation control mode in which all of the first bilateral switching devices connecting the intermediate potential point in the DC circuit and the AC output points in all of the switching arms are brought into normally turned-off states and on-off control is carried out with respect to all of the switching devices in all of the switching arms in the electric power converter section.

12. The electric power converter as claimed claim 1, wherein the DC to DC converter section comprises a positive electrode side switching arm having a pair of switching devices connected in series between the positive electrode side line and the intermediate potential line, a negative electrode side switching arm having a pair of switching devices connected in series between the intermediate potential line and the negative electrode side line, a first step-up reactor inserted between a first connection point between the switching devices in the positive electrode side switching arm and the positive electrode side of the battery, and a second step-up reactor inserted between a second connection point between the switching devices in the negative electrode side switching arm and the negative electrode side of the battery.

13. The electric power converter as claimed in claim 1, wherein the DC to DC converter section comprises a positive electrode side switching arm having a pair of switching devices connected in series between the positive electrode side line and the intermediate potential line, a negative electrode side switching arm having a pair of switching devices connected in series between the intermediate potential line and the negative electrode side line, and a step-up reactor inserted in the short circuit, a first connection point between the switching devices in the positive electrode side switching arm being connected to the positive electrode side of the battery, and a second connection point between the switching devices in the negative electrode side switching arm being connected to the negative electrode side of the battery.

14. An electric power converter comprising:
a DC power supply section outputting DC electric power by electric power generation;
a battery with at least two battery units connected in series;
a DC to DC converter section adjusting DC electric power of the battery and having a positive electrode side line and a negative electrode side line;
a DC circuit having at least two DC link capacitors connected in series between the positive electrode side line and the negative electrode side line;
an electric power converter section connected to the DC circuit to convert DC electric power to AC electric power and supply the converted AC electric power to a motor;
a first bilateral switching device connecting a first intermediate potential point between the DC link capacitors to an AC output point in the electric power converter section; and
a short circuit formed with an intermediate potential line short-circuiting the first intermediate potential point to a second intermediate potential point between the battery units.

15. The electric power converter as claimed in claim 14 wherein the DC power supply section comprises an AC generator driven by an internal combustion engine and an AC to DC electric power converter section converting AC electric power generated by the AC generator to DC electric power.

16. The electric power converter as claimed in claim 14 wherein the DC power supply section is formed with a DC generator unit formed with at least one of a fuel cell and a solar cell.

17. The electric power converter as claimed in claim 14, wherein an additional bilateral switching device is inserted between the first and second intermediate potential points.

* * * * *